(12) United States Patent
Bury et al.

(10) Patent No.: US 8,147,257 B2
(45) Date of Patent: Apr. 3, 2012

(54) APPARATUS FOR MOUNTING ELECTRICAL AND MECHANICAL COMPONENTS ON A SUPPORT BODY

(75) Inventors: Joachim Bury, Herford (DE); Rainer Schulze, Detmold (DE); Thomas Salomon, Guetersloh (DE)

(73) Assignee: Weidmueller Interface GmbH & Co., KG, Detmold (DE)

( * ) Notice: Subject to any disclaimer, the term of this patent is extended or adjusted under 35 U.S.C. 154(b) by 587 days.

(21) Appl. No.: 12/320,161

(22) Filed: Jan. 21, 2009

(65) Prior Publication Data

US 2009/0194652 A1 Aug. 6, 2009

(30) Foreign Application Priority Data

Feb. 2, 2008 (DE) .................. 20 2008 001 538 U
Feb. 4, 2008 (DE) .................. 20 2008 001 600 U
Nov. 19, 2008 (DE) .................. 20 2008 015 309 U

(51) Int. Cl.
*H01R 25/00* (2006.01)

(52) U.S. Cl. ........................................ 439/110

(58) Field of Classification Search .......... 439/110–122, 439/716, 540.1
See application file for complete search history.

(56) References Cited

U.S. PATENT DOCUMENTS

| 5,334,037 A * | 8/1994 | Gabrius et al. ............... 439/118 |
| 5,334,054 A | 8/1994 | Conrad |
| 6,056,561 A * | 5/2000 | Lin ............................... 439/121 |
| 6,478,605 B2 | 11/2002 | Stuckmann |
| 6,500,021 B2 | 12/2002 | Wilmes |
| 6,575,771 B2 | 6/2003 | Schnatwinkel |
| 6,994,571 B2 * | 2/2006 | Hoffmann ..................... 439/110 |

FOREIGN PATENT DOCUMENTS

| DE | 198 59 716 A1 | 6/2000 |
| DE | 100 11 385 A1 | 9/2001 |
| DE | 102 55 490 A1 | 7/2004 |
| DE | 10 2005 054252 B4 | 4/2009 |
| EP | 1 443 617 A1 | 8/2004 |

\* cited by examiner

*Primary Examiner* — Chandrika Prasad
(74) *Attorney, Agent, or Firm* — Lawrence E. Laubsscher, Sr.; Lawrence E. Laubscher, Jr.

(57) ABSTRACT

An electrical, electronic, fiber-optic, hydraulic, or pneumatic component is mounted upon a rectangular support body having an upper surface containing at least one linear groove, wherein a first connector is mounted in protectively concealed relation adjacent a given vertical side wall of the groove beneath an overhanging portion of the support body that extends partially into the groove, and a second connector extends downwardly from the component into the groove when the component is seated on the top surface of the support body. When the component is mechanically or manually horizontally displaced laterally of the groove from its initial inserted position toward a connected position adjacent the given vertical wall, the second connector is brought into connection with the first connector. In the preferred embodiment, the first and second connectors are electrical devices connected with electrical or electronic circuits contained within the component.

33 Claims, 19 Drawing Sheets

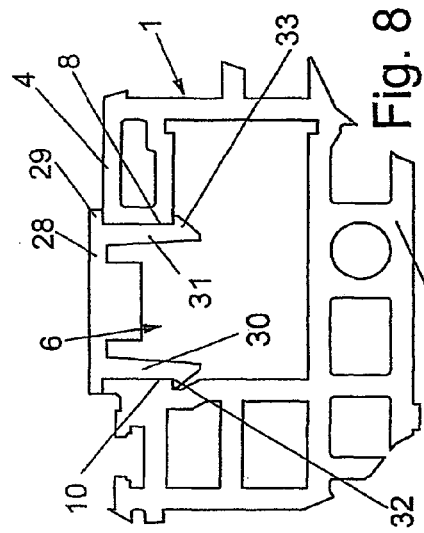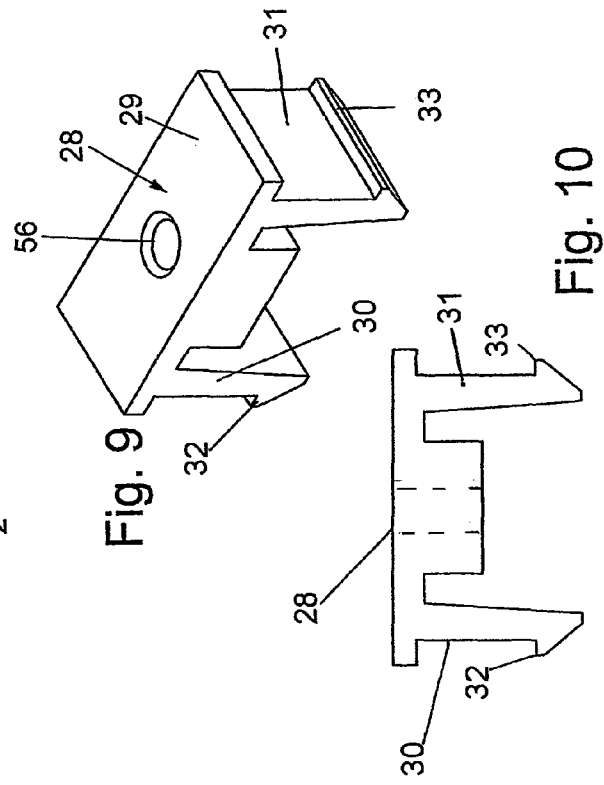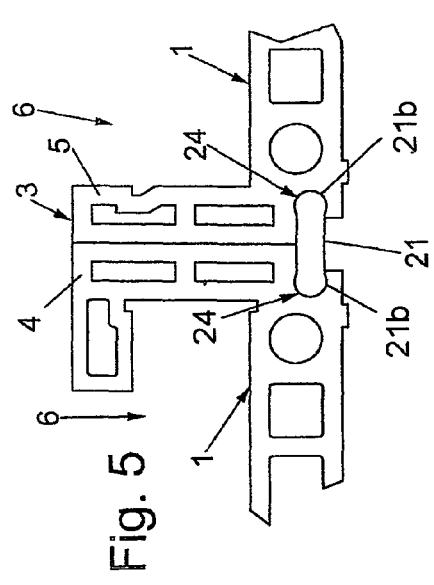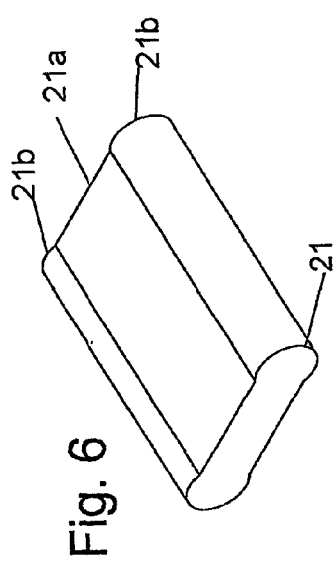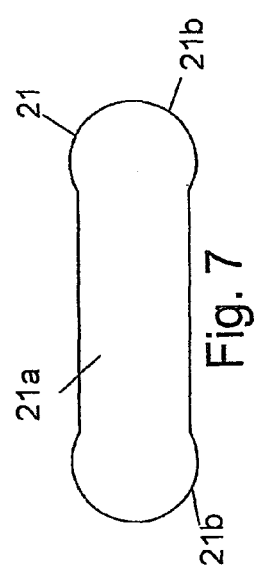

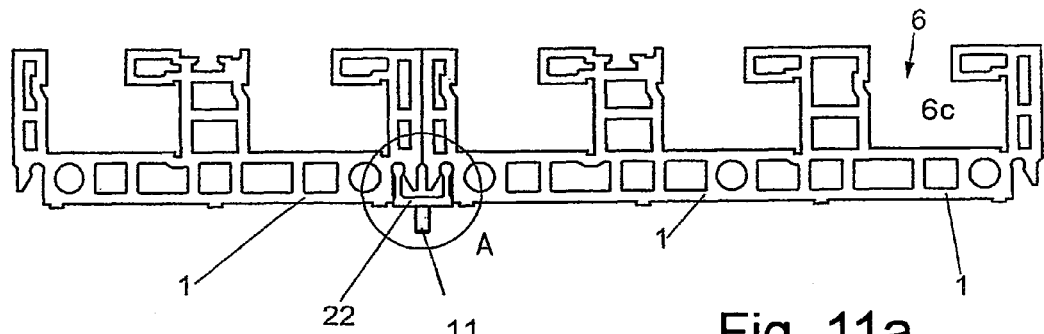
Fig. 11a
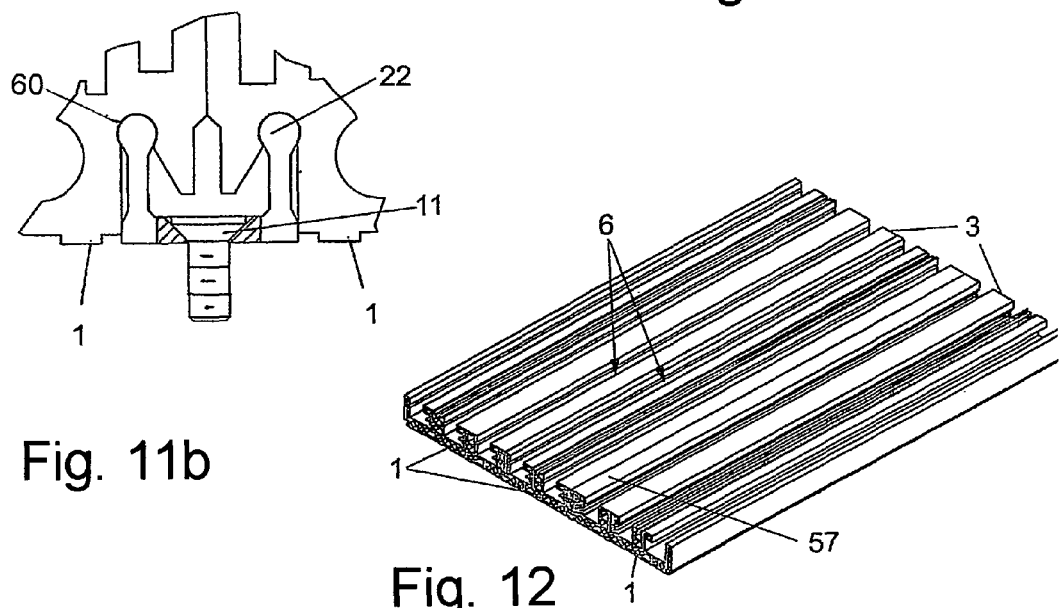
Fig. 11b
Fig. 12
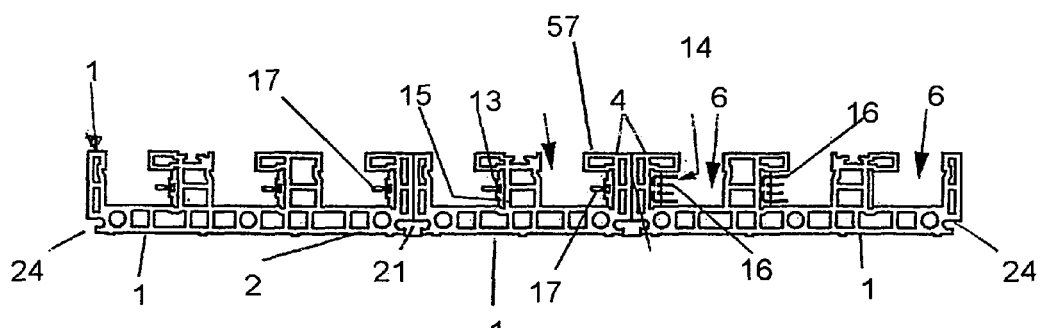
Fig. 13

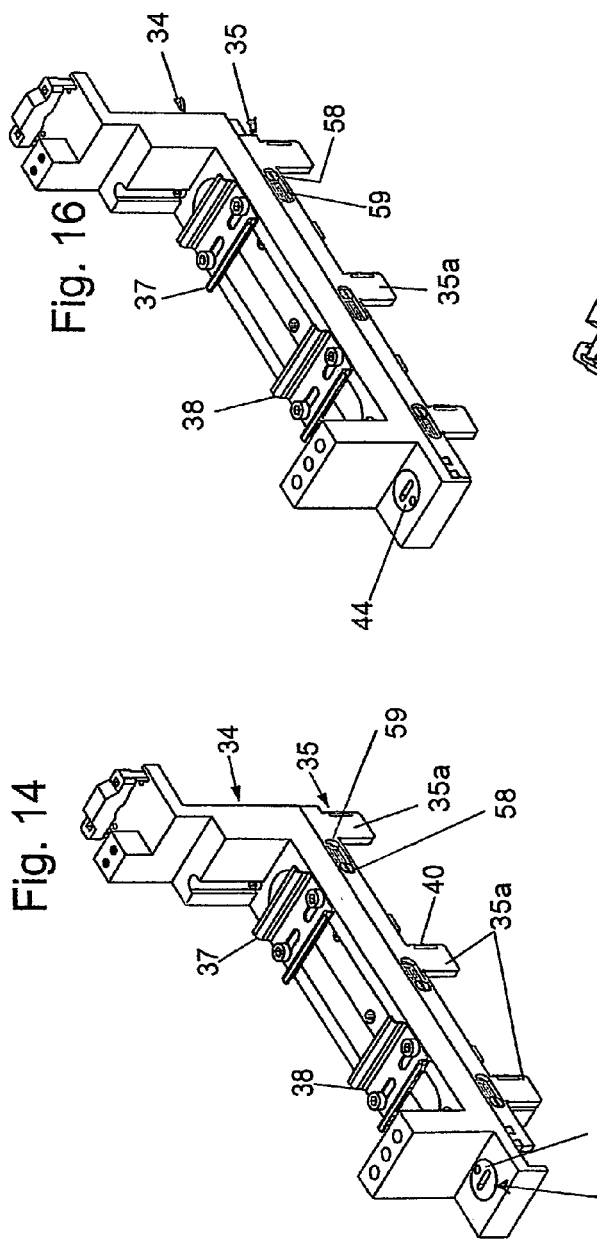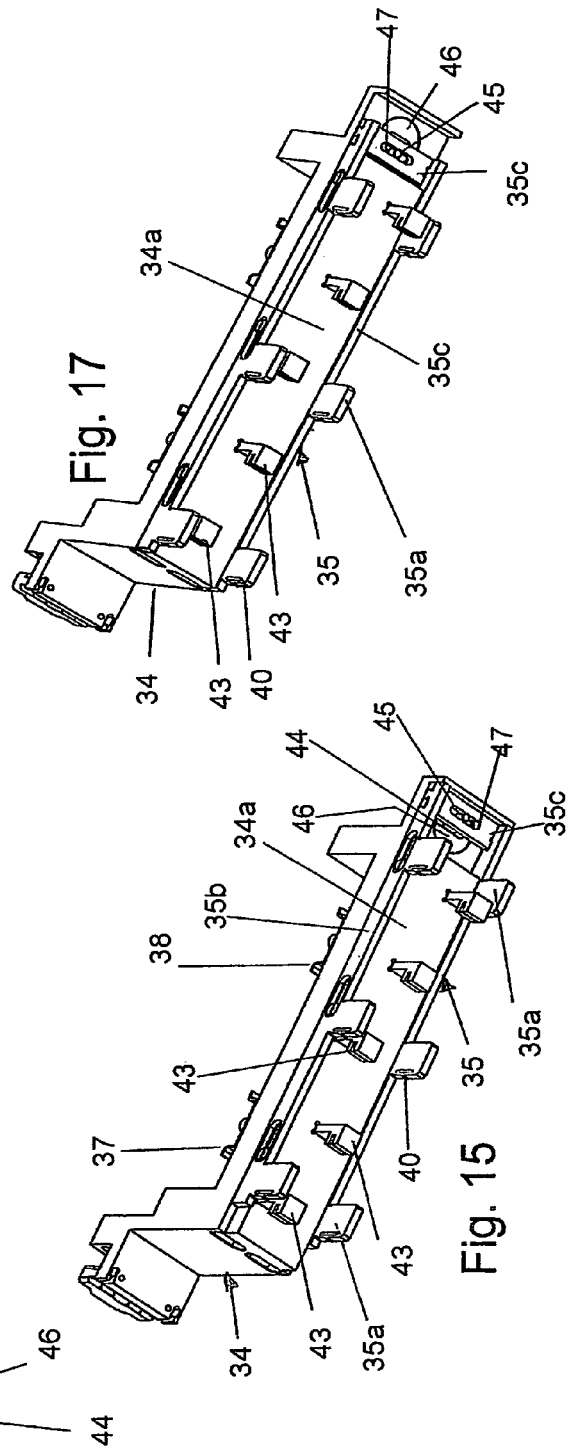

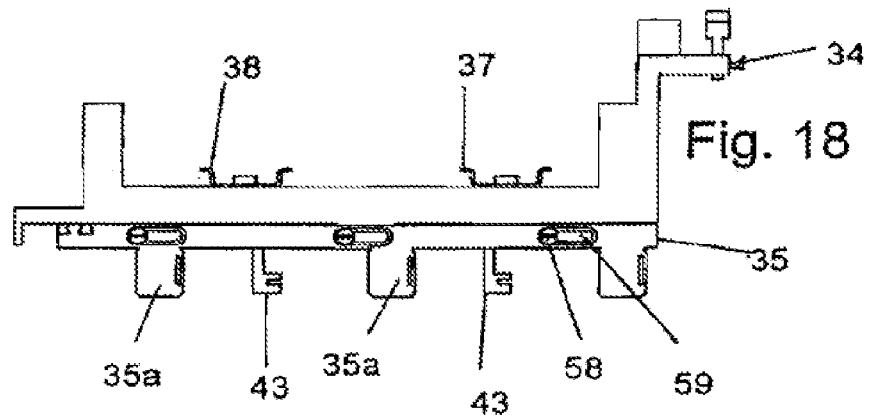
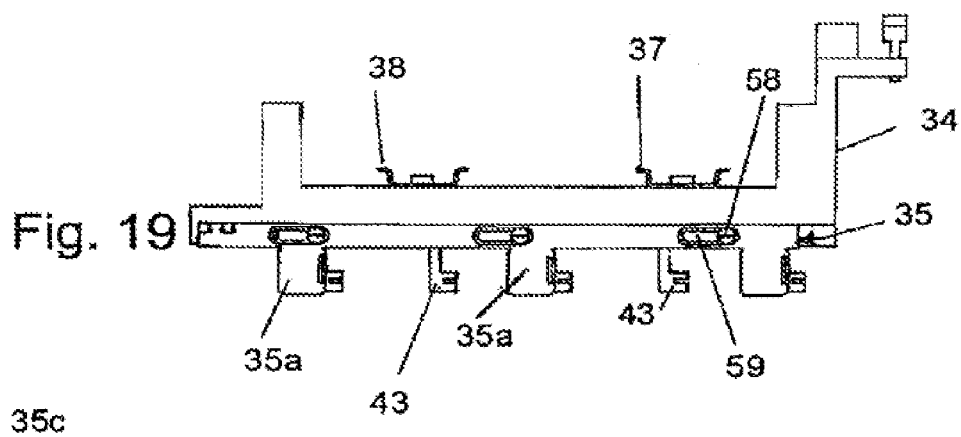
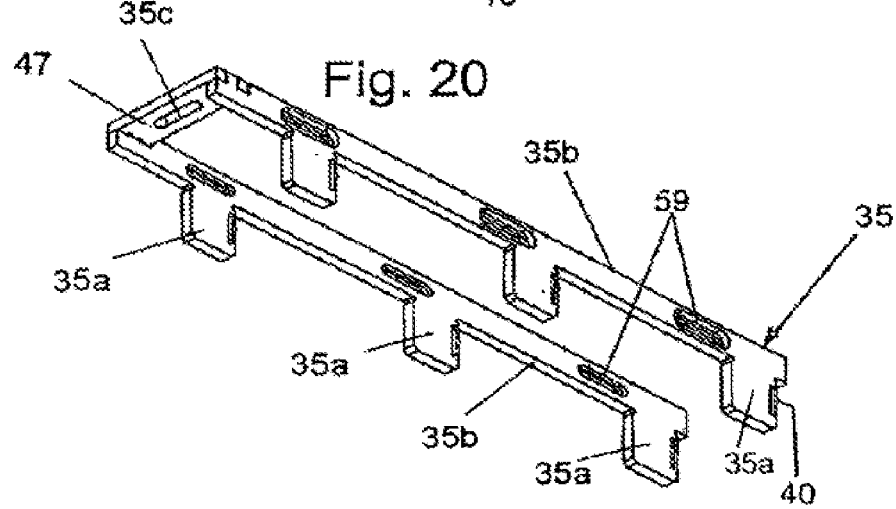

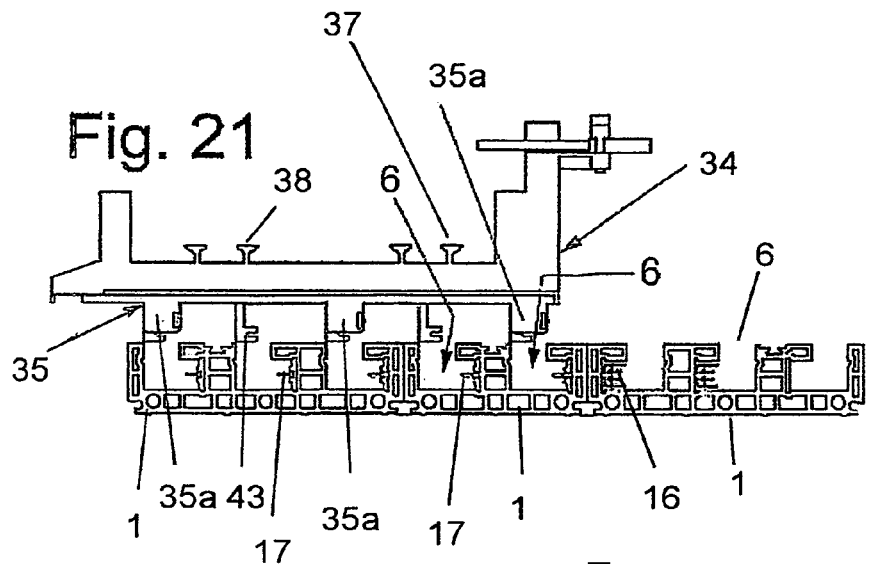
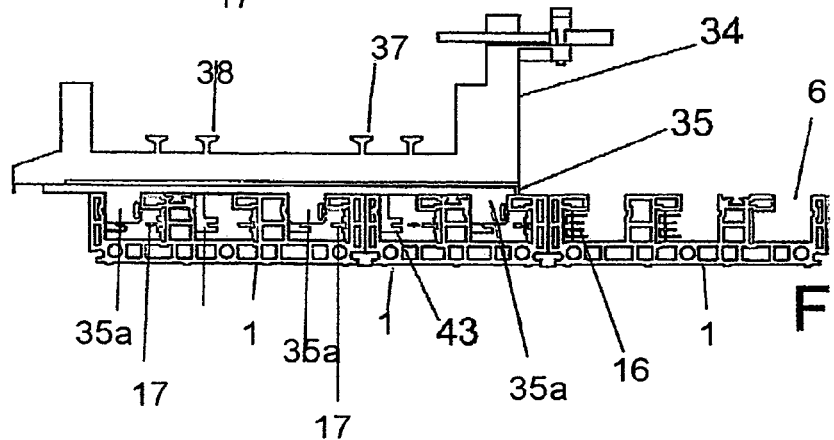
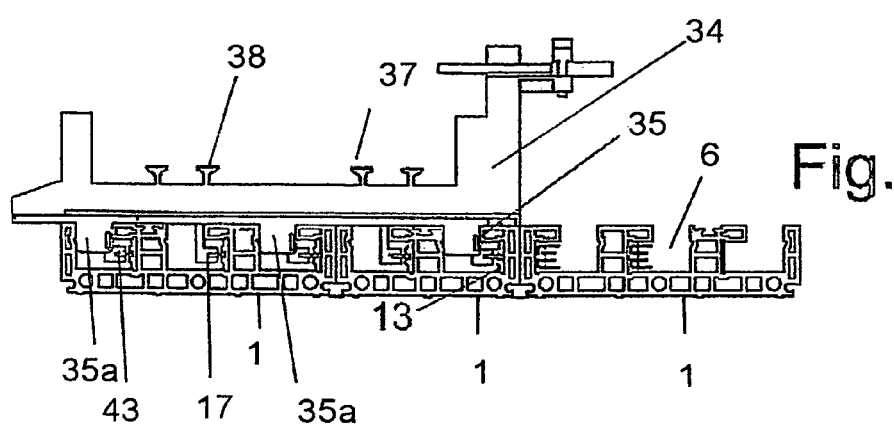

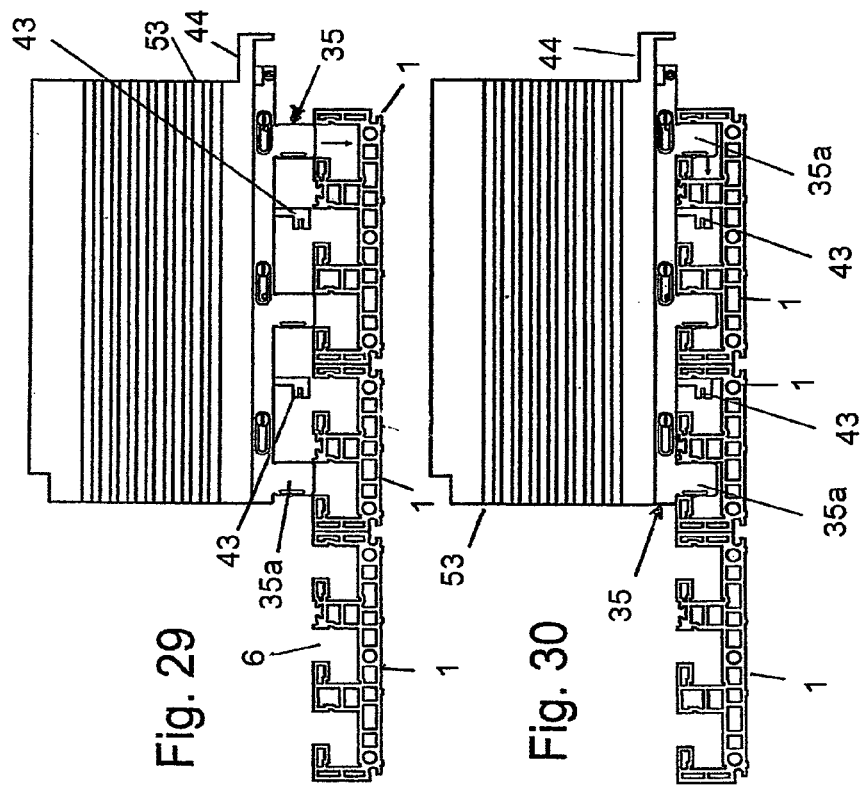
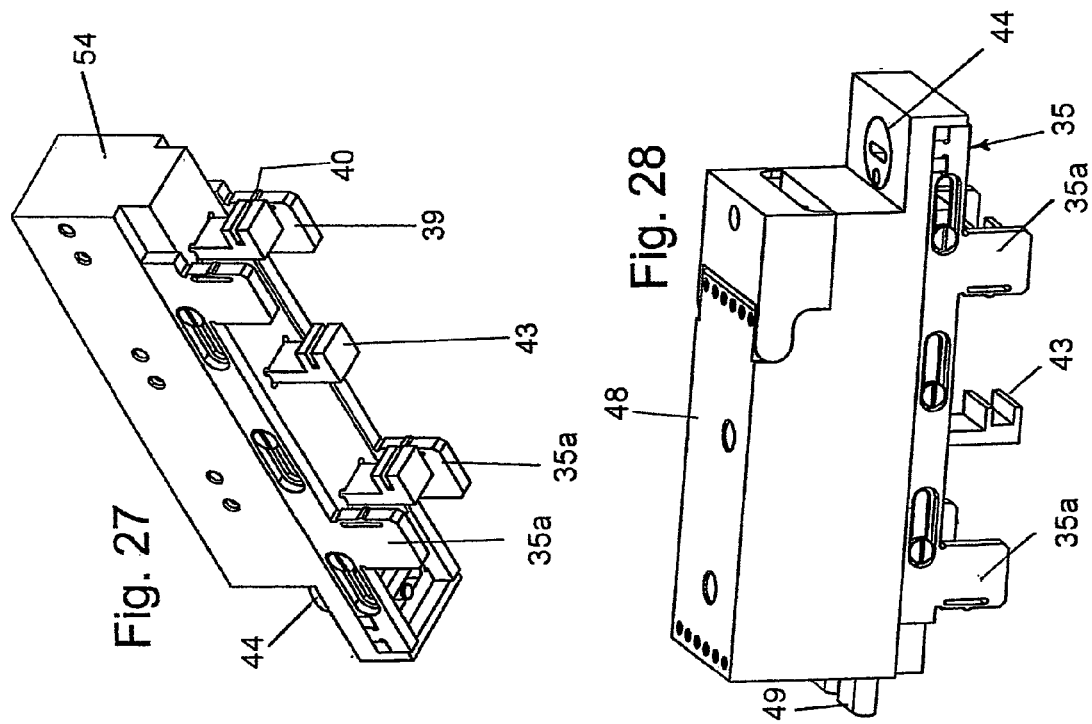

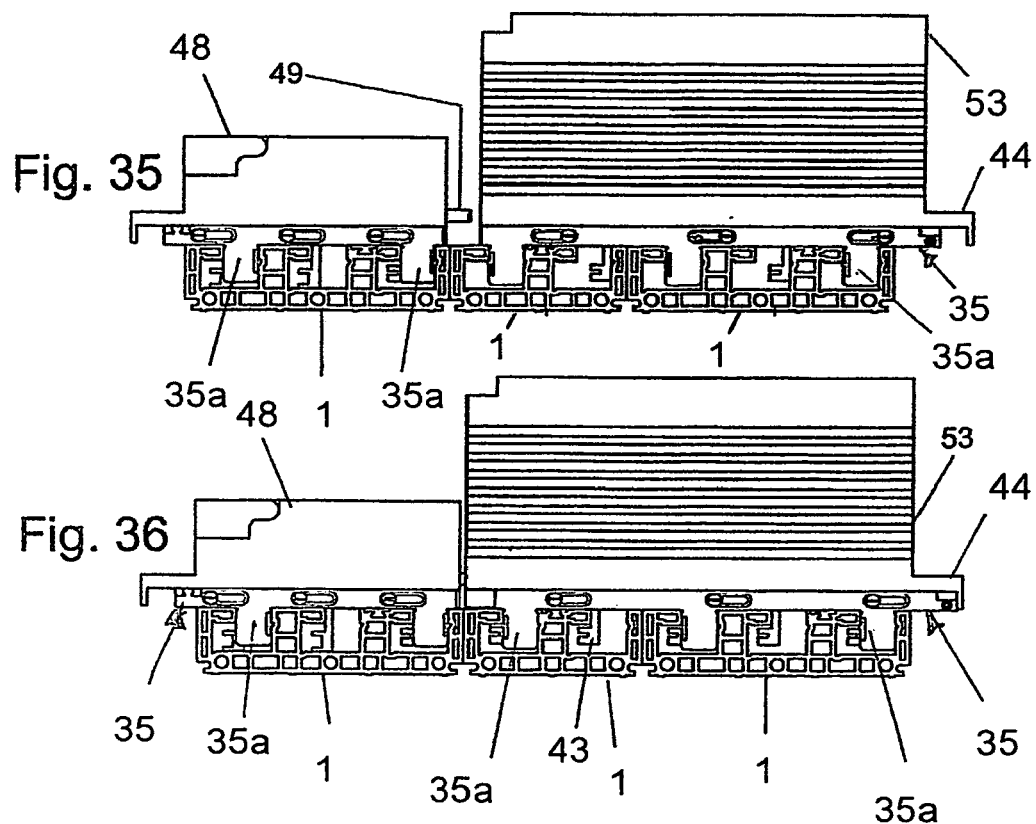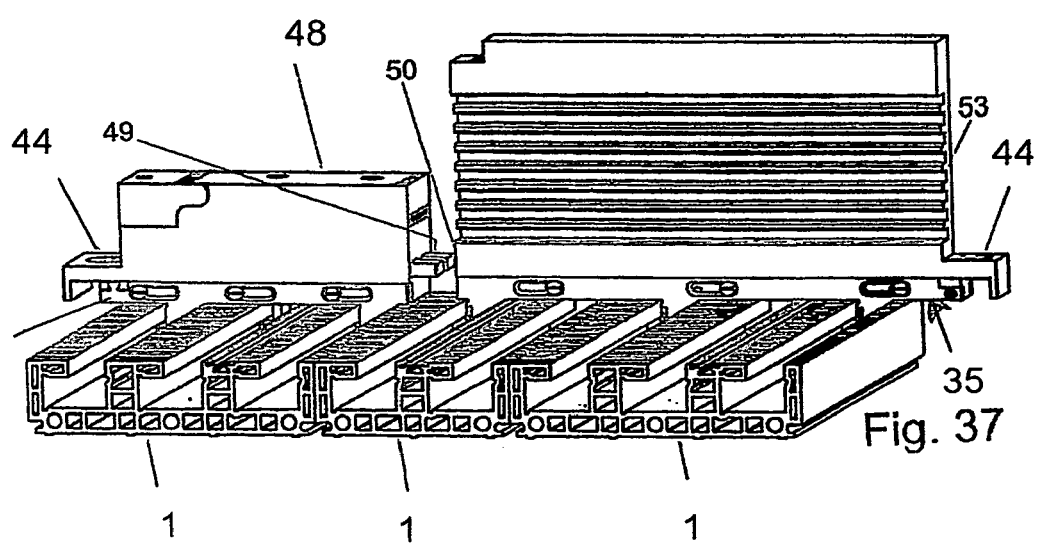

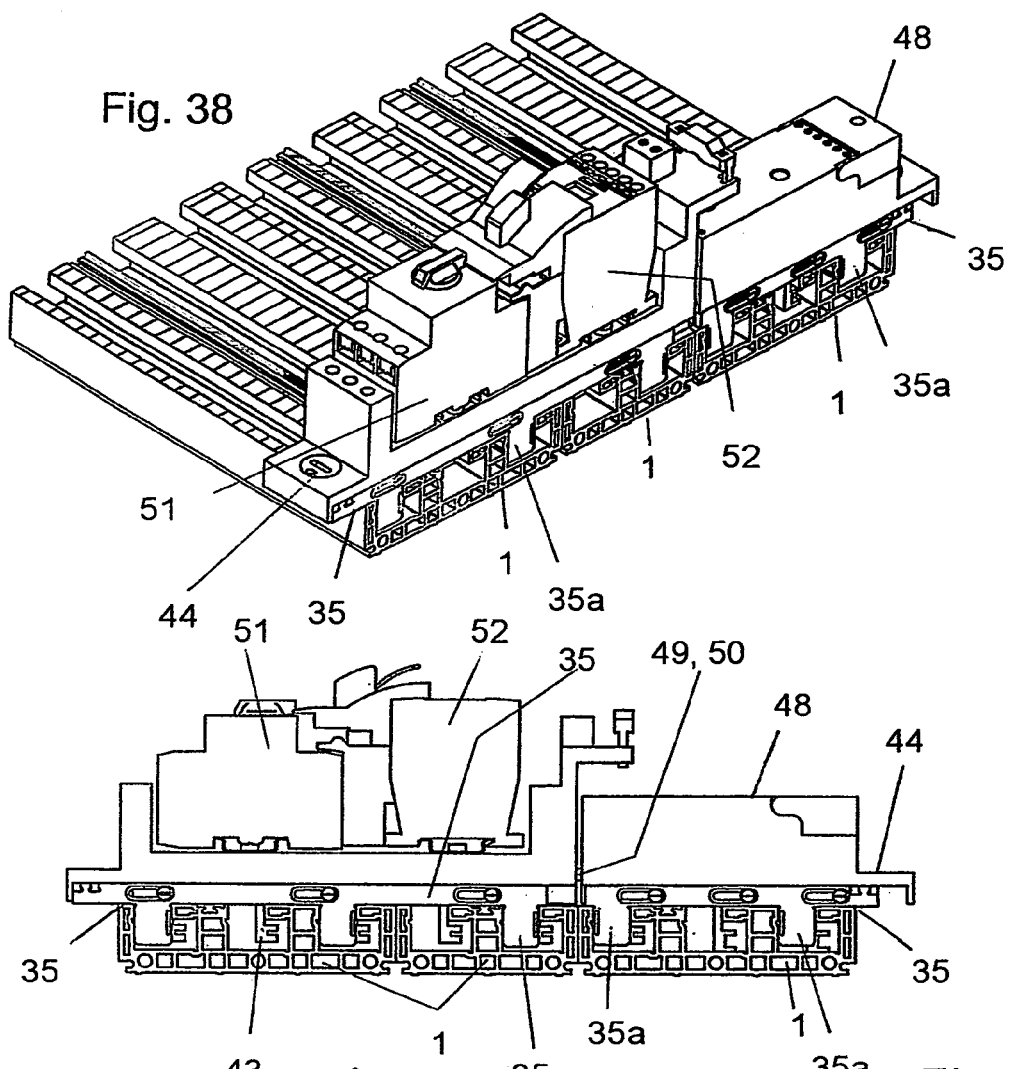
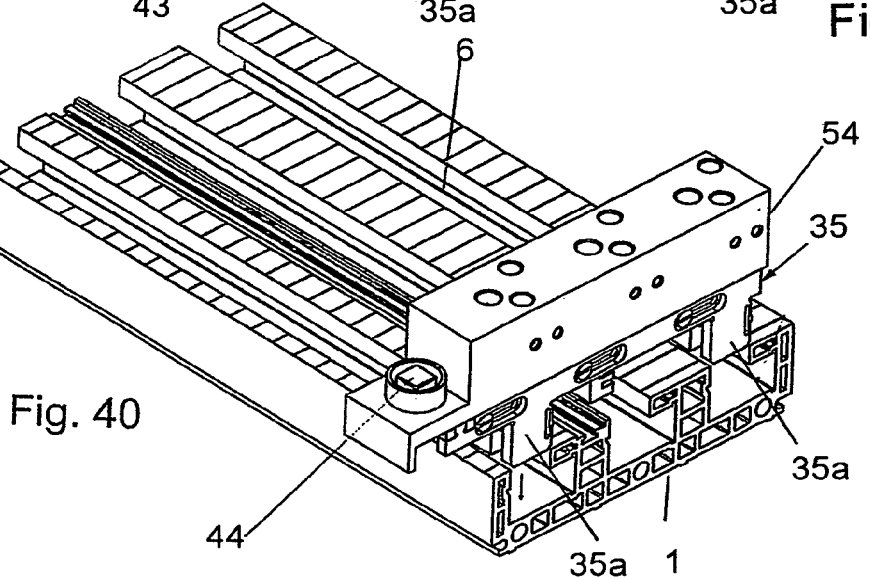

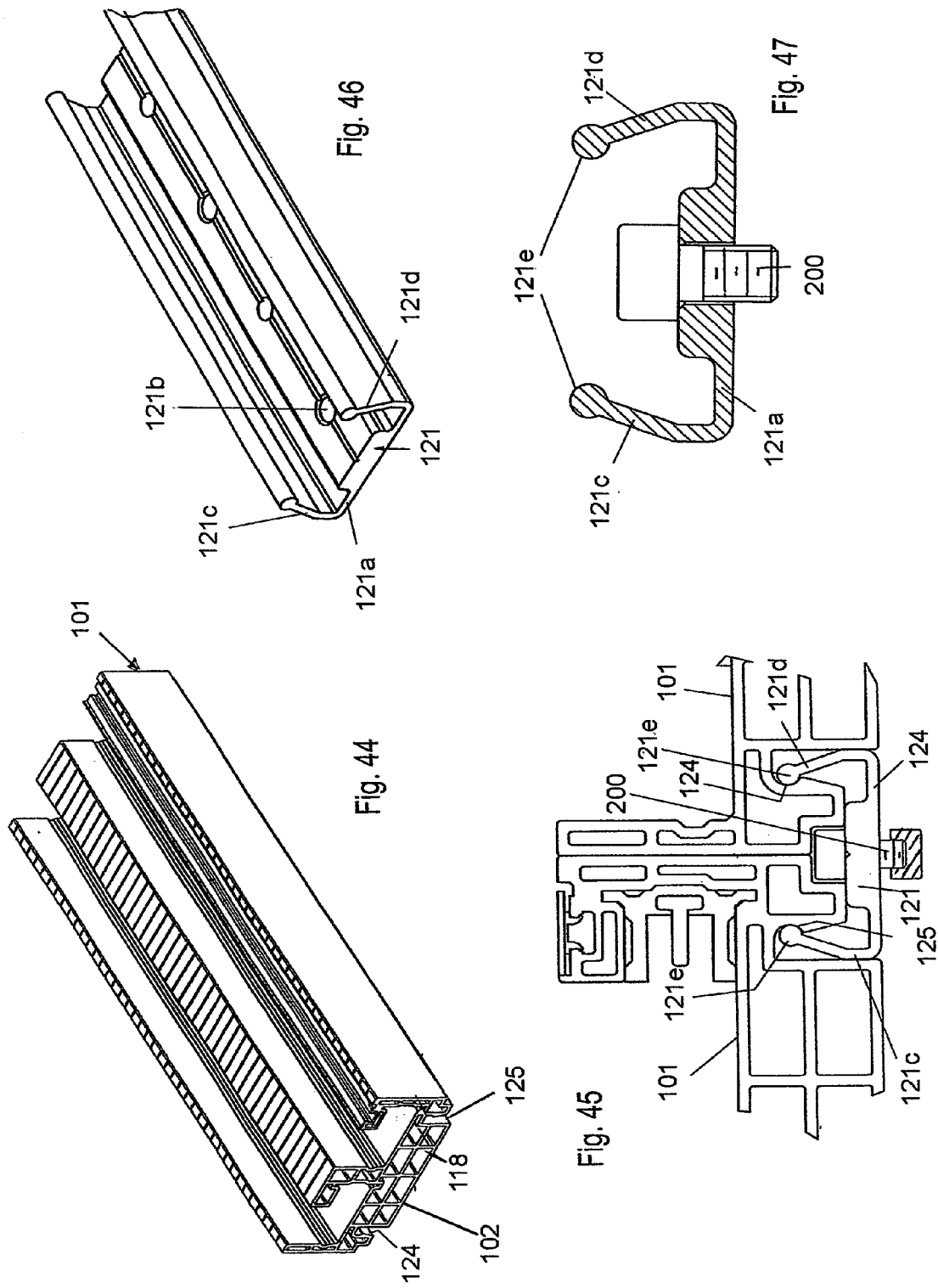

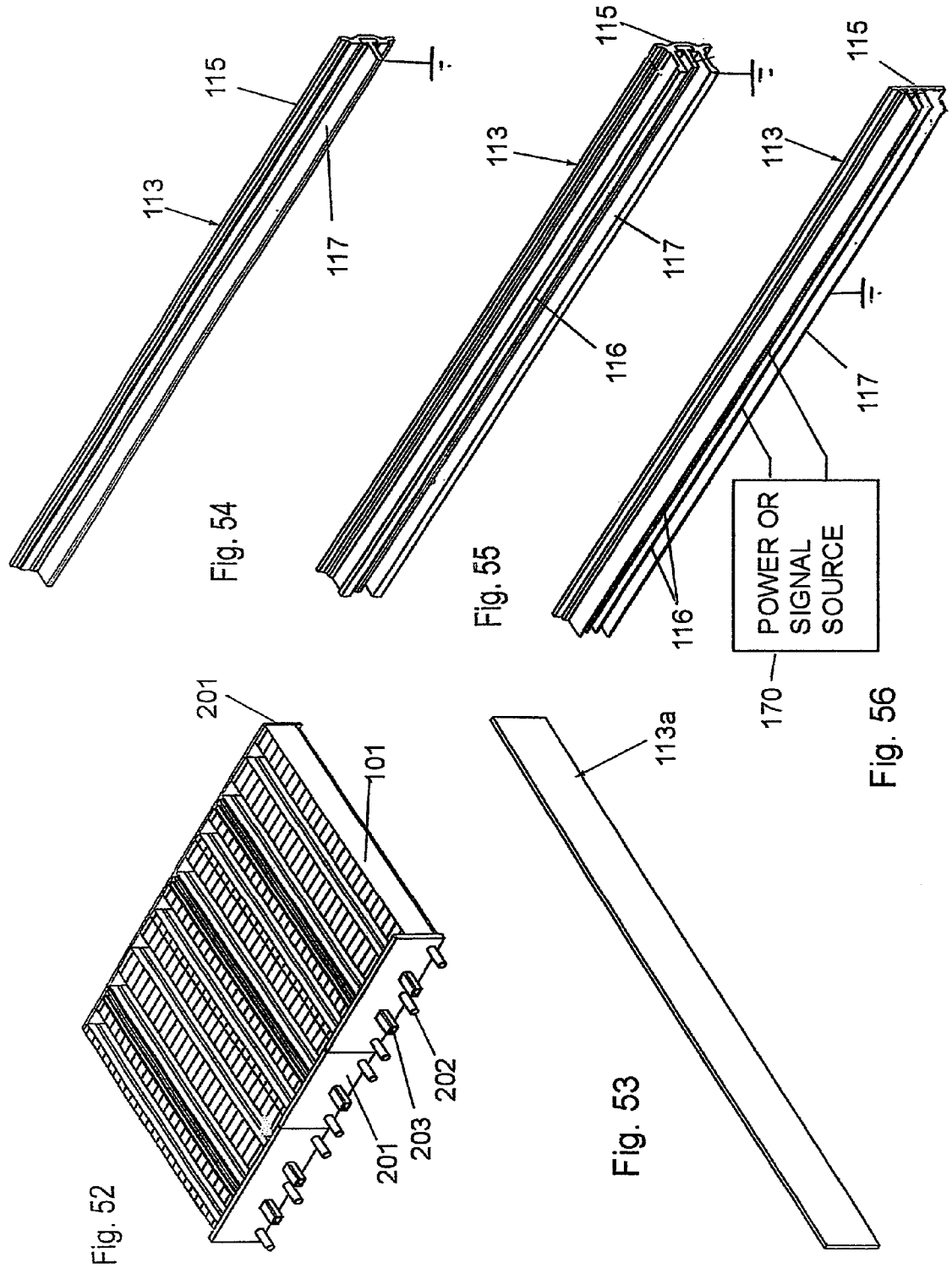

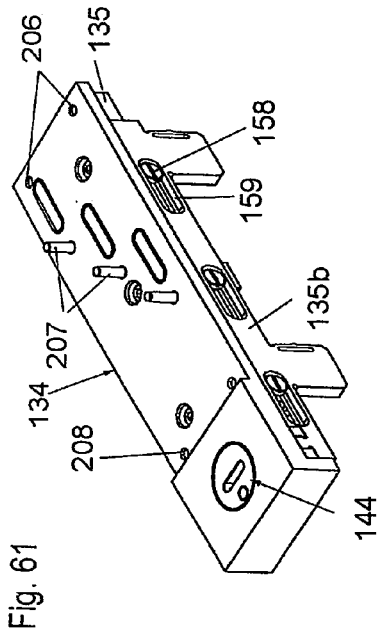
Fig. 59
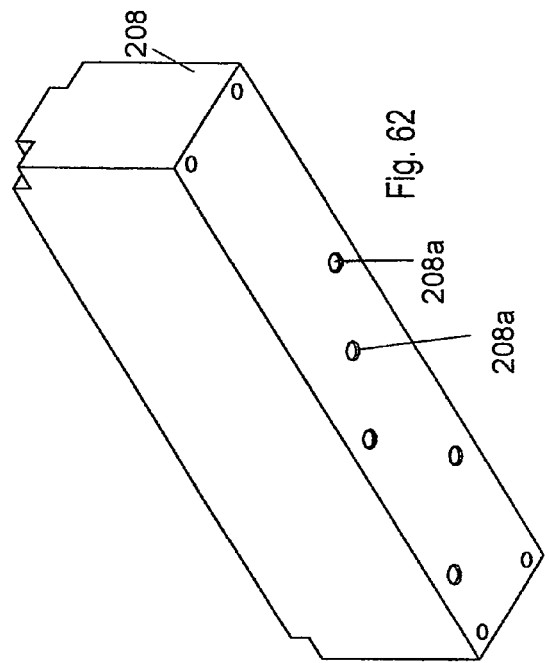
Fig. 61
Fig. 62
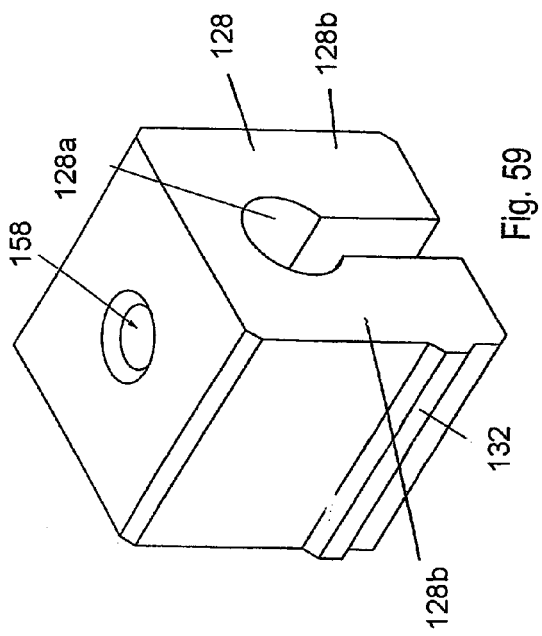
Fig. 60
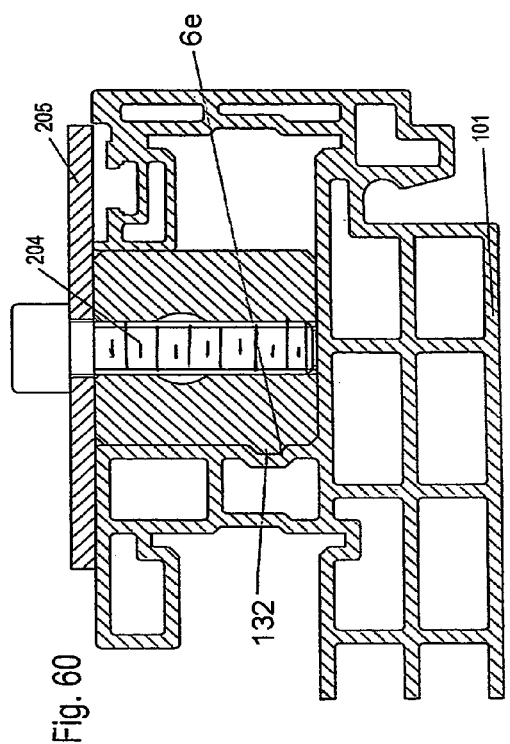

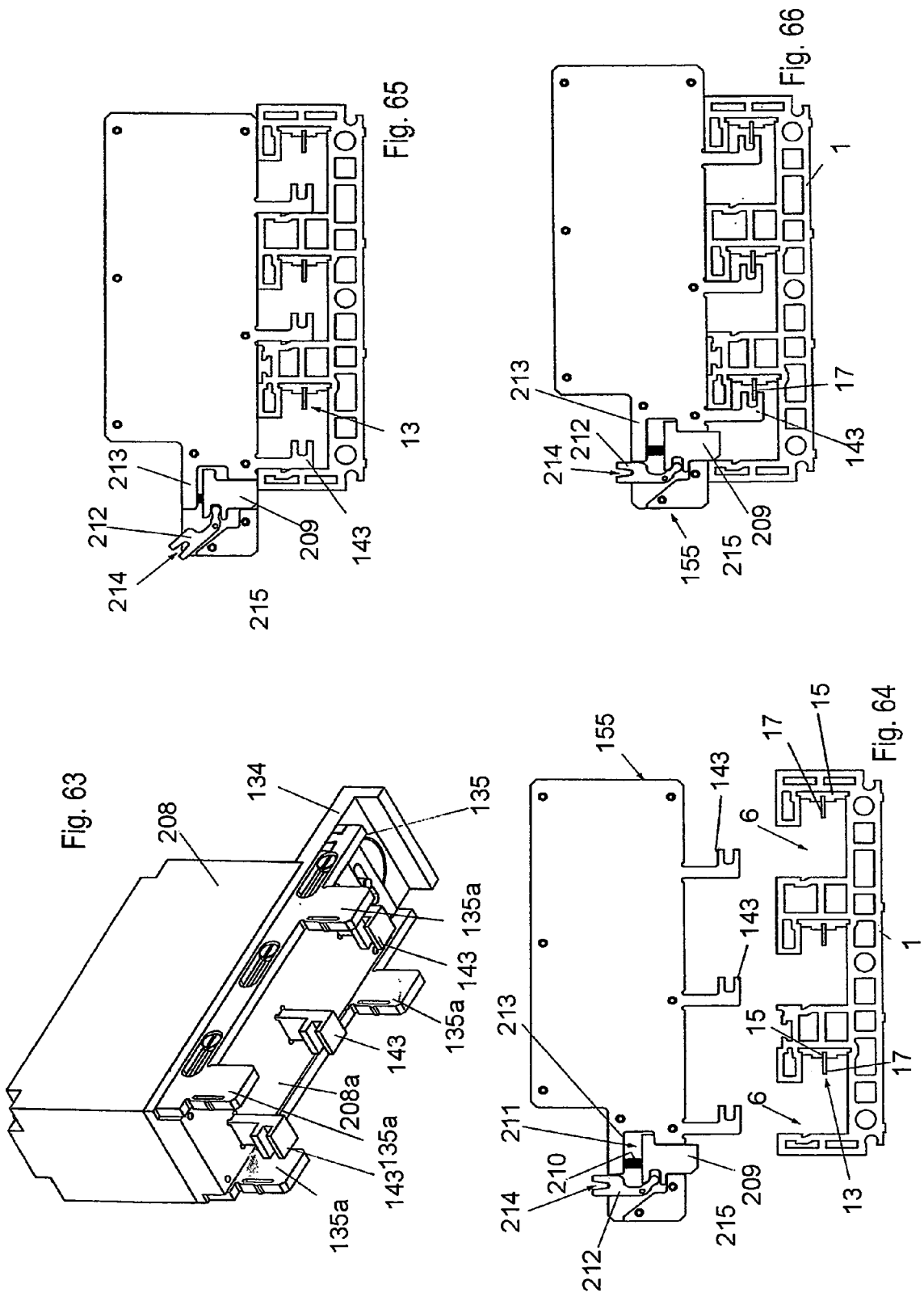

APPARATUS FOR MOUNTING ELECTRICAL AND MECHANICAL COMPONENTS ON A SUPPORT BODY

BACKGROUND OF THE INVENTION

1. Field of the Invention

An electrical, electronic, fiber-optic, hydraulic or pneumatic component is mounted upon a rectangular support body having an upper surface containing a linear groove, wherein a first connector is mounted in protectively concealed relation on a given vertical side wall of the groove beneath an overhanging portion of the support body that extends partially into the groove, and a second connector extends downwardly from the component into the groove when the component is seated on the top surface of the support body. When the component is mechanically or manually horizontally displaced laterally of the groove from its initial inserted position toward a connected position adjacent the given vertical wall, the second connector is brought into connection with the first connector.

2. Description of Related Art

For assembly of stackable electric components and/or devices, e.g., modular terminals or electronic housings for electronic components of any type, it has long been known that mounting rails in a hat-shaped embodiment may be used, said rails being mounted on a base plate, e.g., the rear wall of a control cabinet. Examples of such mounting systems are disclosed in the prior U.S. patents to Conrad et al U.S. Pat. No. 5,334,054, Stuckmann et al U.S. Pat. No. 6,478,605, Wilmes et al U.S. Pat. No. 6,500,021, and Schnatwinkel et al U.S. Pat. No. 6,575,771, among others.

From a mechanical standpoint, this type of fastening has proven successful, but the mounting rails are not optimal with regard to their electric function.

It is thus often necessary according to the prevailing state of the art to provide power supply buses, data buses or combined power supply buses and data buses in the stacking direction.

To do so, it is known that bus rails can be engaged in or adhesively secured to the mounting rails, but this is complicated and relatively expensive and is still not optimal with regard to functionality.

There have therefore already been proposals for implementing mounting rails made of plastic that can be attached to a base plate. Reference is made in this regard to EP 1 443 617 A1 or DE 198 59 716 A1. However, these concepts also rely relatively closely on the essentially known embodiment of hat-shaped mounting rails.

Against this background, the present invention goes in a different direction and has taken on the task of creating a mounting system that is definitely more simplified and can be configured in a flexible manner, allowing easy mechanical assembly of electric and/or mechanical components on an assembly base but also being advanced with regard to contacting of power buses and/or data buses, i.e., being especially simple and easy to handle and nevertheless especially reliable in its function.

SUMMARY OF THE INVENTION

Accordingly, a primary object of the present invention is to provide a connector assembly including an electrical, electronic, fiber-optic or pneumatic or hydraulic component mounted upon a rectangular support body having an upper surface containing at least one linear groove, a first connector mounted in protectively concealed relation on a given vertical side wall of the groove beneath an overhanging portion of the support body that extends partially into the groove, and a second connector extending downwardly from the component into the groove when the component is seated on the top surface of the support body. When the component is mechanically or manually horizontally displaced relative to said support body laterally of the groove from its initial inserted position toward a connected position adjacent the given vertical wall, the second connector is brought into connection with the first connector.

A more specific object of the invention is to provide mechanical means for displacing the component between its inserted and connected positions relative to the support body, including a mounting frame slidably connected with the bottom portion of the component, said frame having integral foot portions that extend into the grooves contained in the upper surface of the support body, and eccentric pin means for displacing the component relative to the mounting frame and support body. An operating device, such as an eccentric pin and slot arrangement, serves to displace the component relative to the frame and to the support body from an initial inserted position toward a final connected position in which connector means on the component are connected with corresponding stationary connector means mounted within the groove.

A further object of the invention is to provide joining means for connecting the support bodies in either side-to-side or end-to-end relation.

Another object is to provide locking means for locking the component in the connected position relative to the support body.

A further object of the invention is to provide an adapter component having mounting frame means slidably connected with the bottom portion of the component for mounting the component transversely on the upper surface of the support body, said frame having mounting feet that extend within longitudinal grooves contained in the upper surface of the body. The upper surface of the adapter member is provided with inverted hat-shaped mounting rails by means of which components such as electrical terminal blocks can be mounted on the support body. When the adapter component is horizontally displaced from the inserted position toward the connected position, electrical circuits in the terminal block are connected with conductive rail means mounted in the grooves via an electric connector that extends downwardly from the adapter component.

The present invention thus clearly departs from the known mounting rail systems of the prior art while simplifying the design of the control cabinet as well as the assembly and contacting of the respective electric and/or electronic components.

A flexibly configured system is created that is constructed from assembled base support bodies that can be combined in virtually any manner to form an assembly base and are also designed to be assembled in an especially advantageous manner with the electric components to be assembled. Preferably purely mechanical components such as rail pieces, assembly elements, closure elements and the like can also be assembled.

It should be mentioned as especially advantageous that the assembly base sections can be stacked directly on one another to create the overlapping assembly base. However, in the simplest case the assembly base may also consist only of one of the assembly base sections. The preferred assembly base sections are especially simple and reliable to handle in this regard.

The term "section" in the phrase "assembly section" is not to be understood in a restrictive sense. The term refers to extruded sections as well as extruded bodies, injection molded parts or parts that are otherwise shaped and have the functionality indicated in the following text. They preferably have a board-like base section which is suitable for forming directly a continuous control cabinet rear wall or the like without interruptions or at least a part thereof and preferably for replacing the metal plate.

However, the mounting base may also be attached to and/or on a substrate such as a wall, e.g., a machine wall or the like. It is especially preferable to embody the mounting base sections as plastic bodies.

Most preferably, at least one linear receiving groove is embodied in the manner of linear recesses in the mounting base sections. This embodiment is preferably such that first a mechanical locking or prelocking of the electric devices is achieved and then in an additional step the bus rails or bus sections are contacted to the mounting base sections. The bus rails may be utilized and/or designed in a simple manner for power buses or data buses of a wide variety of designs. They may be designed to be continuous or to be used only in sections. When considered in general, the receiving contours may be designed to receive electrically conducting contacts and/or fiber-optic contacts of a wide variety of types.

It has again been found to be especially advantageous if the receiving grooves form a type of inverted L-shape or T-shape configuration because the L-shape or T-shape allows implementation of mechanical locking on a base leg in an especially simple manner, whereas the transverse leg of the L-shaped or T-shaped receiving grooves makes it possible to perform separate contacting of a bus rail only following engagement of the electric components. An I-shape with a preliminary lock and a final catch/switch position in various heights of the contour would also be conceivable.

The function of mechanical contacting and/or mechanical locking and electric contacting may be separated from one another in a clearly discernible manner and may be performed in succession one after the other, for example.

An electric and/or mechanical component for a mounting system is also created, characterized by the provision of an adapter component of unique design. The components/devices may also form overlapping modules. The "electric" components in the sense of this patent application also comprise components having a fiber-optic function.

BRIEF DESCRIPTION OF THE DRAWINGS

Other objects and advantages of the invention will become apparent from a study of the following specification, when viewed in the light of the accompanying drawing, in which:

FIG. 5 is a detailed end elevation view of a pair of support bodies connected by a joining member, and FIGS. 6 and 7 are perspective and end views, respectively, of the joining member of FIG. 5;

FIG. 8 is a detailed side elevation view illustrating the connection of a connecting member to the support body, and FIGS. 9 and 10 are perspective and side elevation views of the connecting member;

FIGS. 11a and 11b are side elevation and detailed side elevation views, respectively, of a second embodiment of connector means for a support body assembly;

FIGS. 12 and 13 are perspective and side elevation views, respectively, of an assembly of three support bodies;

FIGS. 14 and 15 are top and bottom perspective views, respectively, of an adapter mounting component when in the insertion condition, and FIGS. 16 and 17 are corresponding views when the adapter mounting component is in the connected condition;

FIGS. 18 and 19 are side elevation views of the adapted mounting component of FIGS. 14-18 when in the insertion and connected conditions, respectively;

FIG. 20 is a bottom perspective view of the frame element of the adapter mounting component of FIGS. 14-19;

FIGS. 21-23 are side elevation views illustrating the steps for connecting an adapter mounting component to a support body assembly.

FIGS. 25-28 are perspective views of various electrical components provided with the mounting frame of FIG. 20;

FIGS. 29-31 are side elevation views respectively illustrating the separated, insertion and connected steps for mounting an electrical component on a support body assembly.

FIGS. 35 and 36 are side elevation views illustrating the electrical connection between a pair of components arranged on a support body assembly, and FIG. 37 is a perspective view of the apparatus of FIG. 35;

FIGS. 38 and 39 are perspective and side elevation views, respectively, of the electrical connection between a pair of components mounted on a support body assembly;

FIG. 40 is a perspective view illustrating an electrical component in the inserted condition relative to a support body.

FIG. 44 is a perspective view of a second embodiment of a support body;

FIG. 45 is a detailed side elevation view illustrating a second joining element connecting together a pair of support bodies, and FIGS. 46 and 47 are perspective and sectional views, respectively, of the joining member of FIG. 45;

FIG. 52 is a perspective view of the partially assembled components of the assembly of FIG. 49;

FIGS. 53-56 are perspective views of various embodiments of the connector elements that are mounted in the grooves of the support bodies;

FIGS. 59 and 60 are perspective views and detailed sectional views, respectively, of the mounting block of FIG. 58;

FIGS. 61 and 62 are perspective views of an adapter mounting component and an electrical component, respectively, and FIG. 63 is a bottom perspective view of the components of FIGS. 61 and 62 in the assembled condition; and FIGS. 64-66 are side views illustrating the locking operation steps for locking an electrical component when in the separated, insertion and connected positions, respectively, relative to a support body.

DETAILED DESCRIPTION OF THE INVENTION

Figure 1:
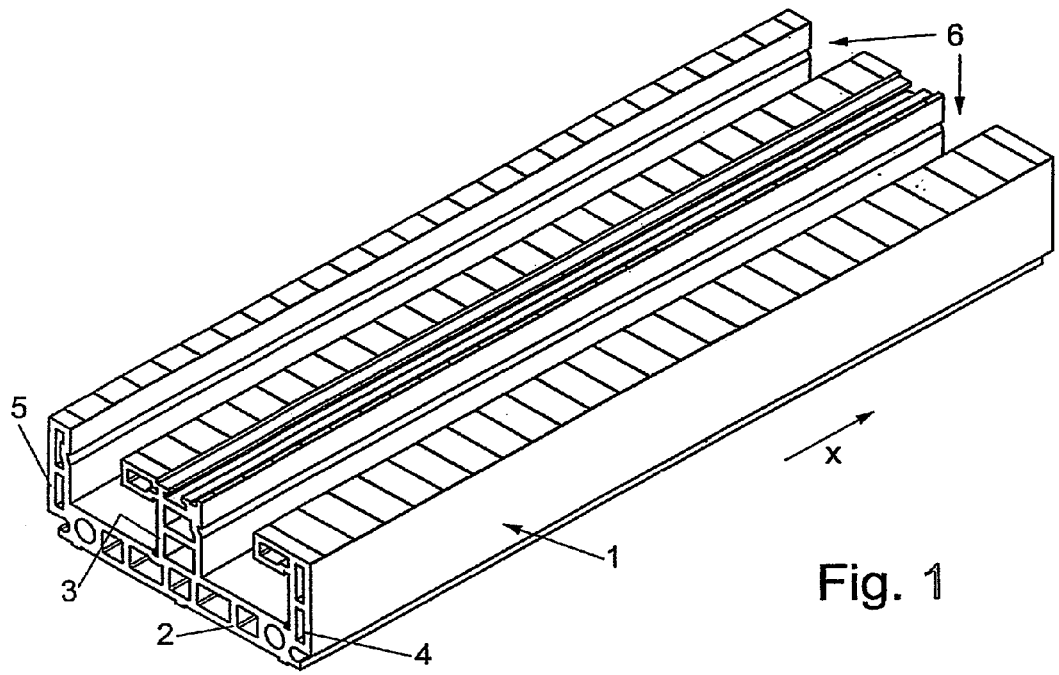
FIGS. 1 and 2 are perspective and end elevation views, respectively, to a first form of support body in accordance with the present invention.

Referring first more particularly to FIGS. 21-23, the present invention relates to an arrangement for mounting an electrical component 34 upon a planar assembly of support bodies 1 having upper surfaces that contain a plurality of parallel longitudinal grooves 6. To this end, a connecting frame 35 is slidably connected with the lower surface of the component 34, which frame includes foot portions 35a that are adapted to extend downwardly into the grooves 6. When the component 34 is in the fully separated condition of FIG. 21, a plurality of contacts 43 extend downwardly from the bottom surface of the component 34. When the component 34 is displaced downwardly toward the insertion position of FIG. 22, the foot portions 35a of the frame 35 and the contacts 43 depending downwardly from the component 34 are displaced downwardly into the grooves 6, whereupon the component is seated in an initial position on the upper surface of the support body assembly. When the component 34 is slidably displaced toward the right toward a connected position relative to the frame 35 and to the support body 1, the contacts 43 on the component 34 are brought into electrical engagement with the conductive rails 16 and 17 that are mounted within the grooves 6.

The component 34 of FIGS. 21-23 is a generally rectangular adapter component formed of synthetic plastic material and having an upper surface upon which is mounted a pair of spaced inverted-hat-shaped mounting rails 37 and 38 adapted for connection with another component, such as a terminal block or the like. When the conducting member 17 is a ground rail component, the rail 17 is connected with the mounting rails 37 and 38 via electrical connectors 43 that extend from the bottom of the adapter component 34, and internal connections, not shown, thereby to ground the rails 37 and 38. As will be described in greater detail below, further conductive rails 16 may be mounted in the grooves 6 for supplying power or electrical signals to similar electrical components mounted on the support body assembly.

Figure 2:
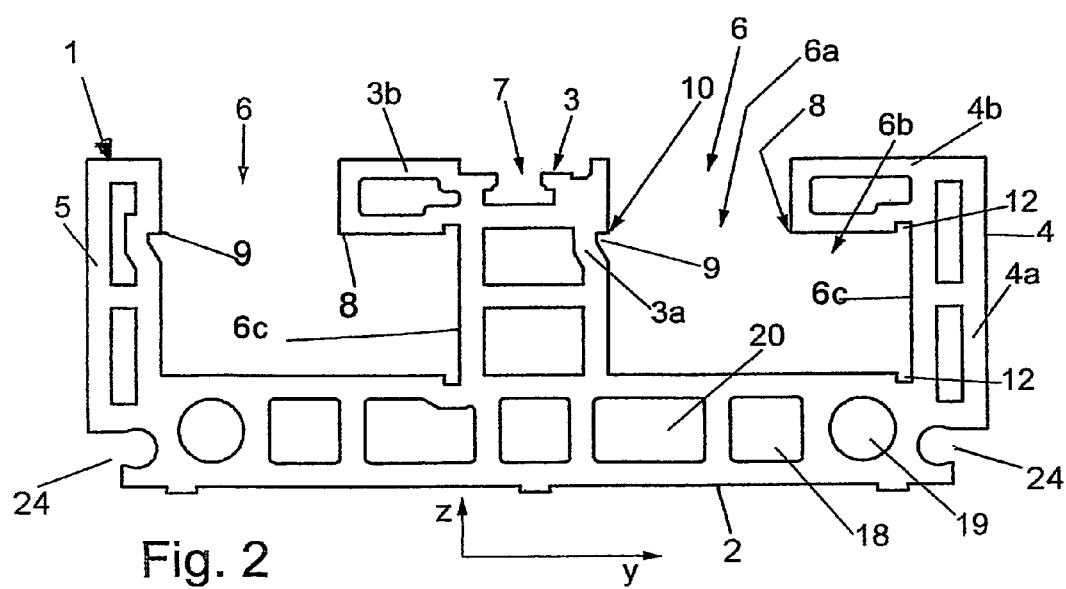

Referring now to FIGS. 1 and 2, the support body 1 has a generally rectangular configuration and is formed of a suitable electrically-insulating synthetic plastic material. The body includes a horizontal base portion 2, and a horizontal upper surface that contains a pair of parallel longitudinally-extending grooves 6. The grooves 6 define in the support body a pair of sidewalls 4 and 5 that extend upwardly from the base portion 2, and a center wall 3 that extends upwardly in space relation between the side walls 4 and 5. As best shown in FIG. 2, the center wall 3 includes a vertical portion 3a that extends upwardly from the base portion 2, and a horizontal portion 3b that extends partially into the associated groove 6. Similarly, the side wall 4 includes a vertical portion 4a that extends upwardly from the base portion, and a horizontal portion 4b that extends partially into the associated groove 6. Thus, the horizontal portions 3b and 4b define overhangs that extend over and conceal the side walls 6c of the grooves. By mounting the bus rails beneath the overhang, they are protected in a relatively shock-proof manner, and are arranged so that they are completely safe to touch within a particular degree of geometry, (width of the grooves, partitions, and the like).

Figure 3:
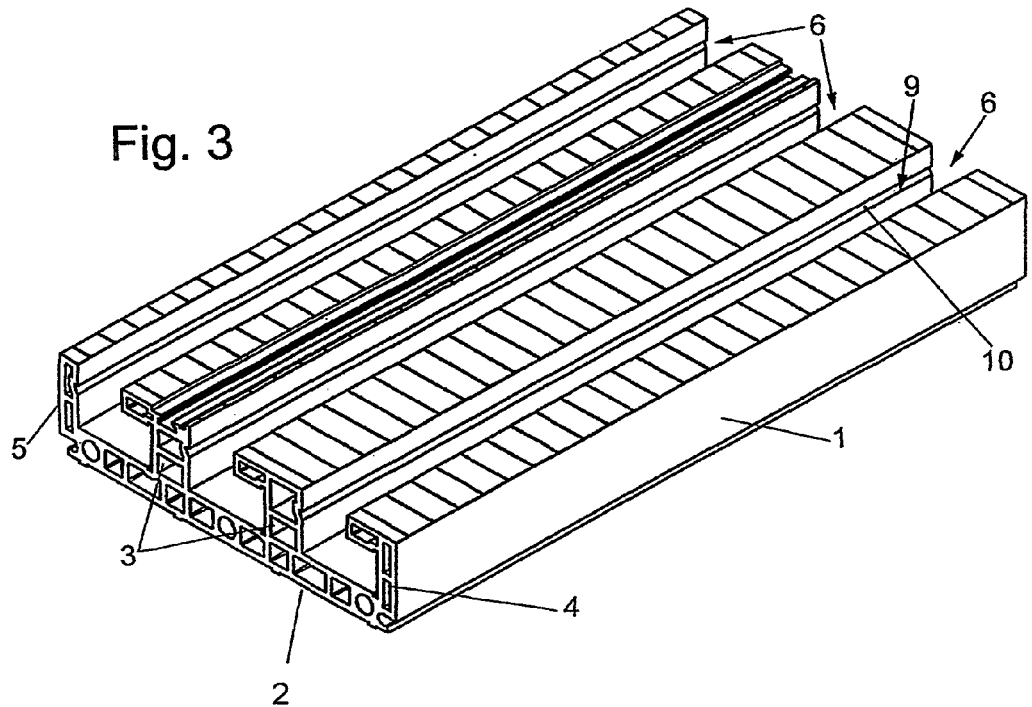
FIGS. 3 and 4 are corresponding views of a modification of the support body of FIGS. 1 and 2.
Figure 4:
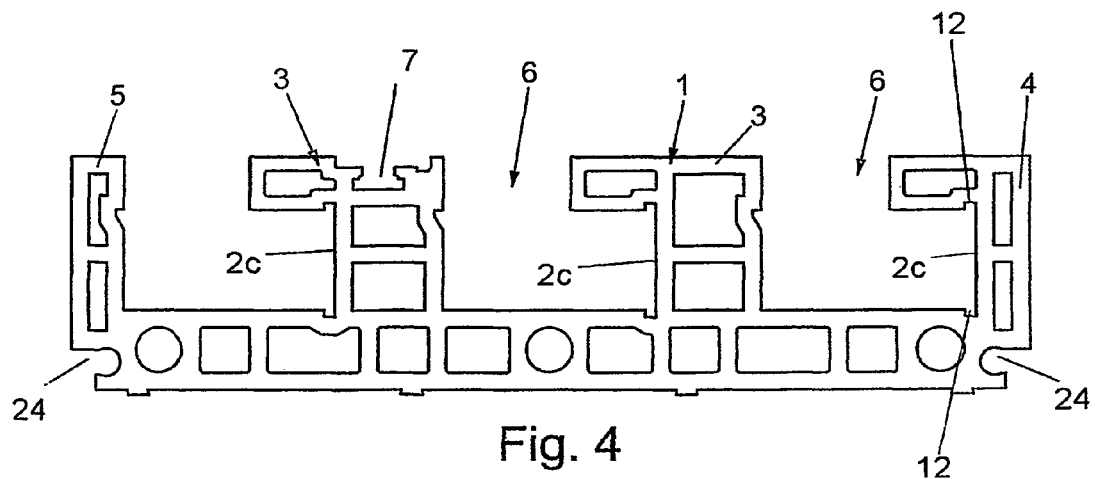
Figure 24:
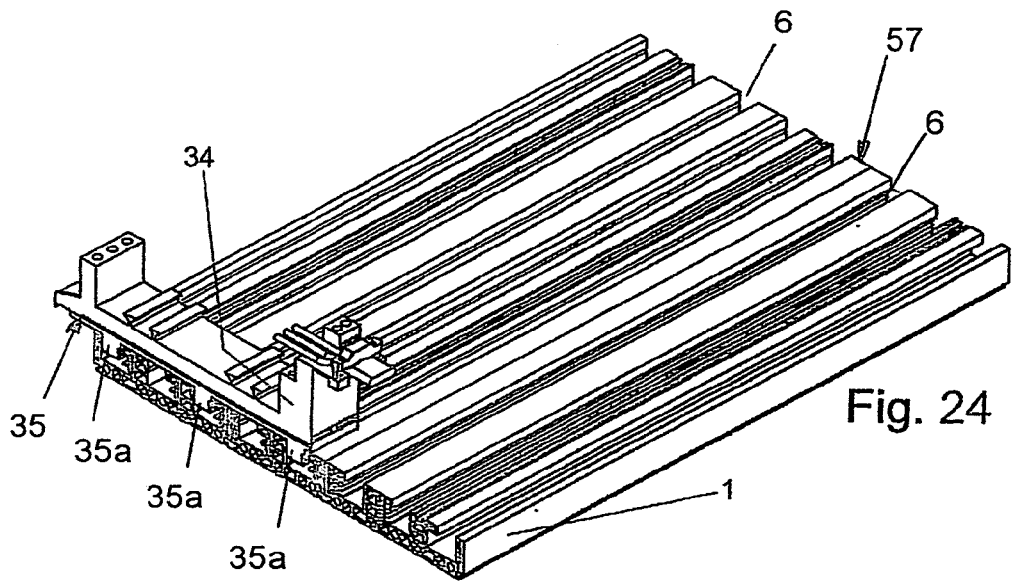
FIG. 24 is a perspective view of the connected elements of FIG. 23.
Figure 25:
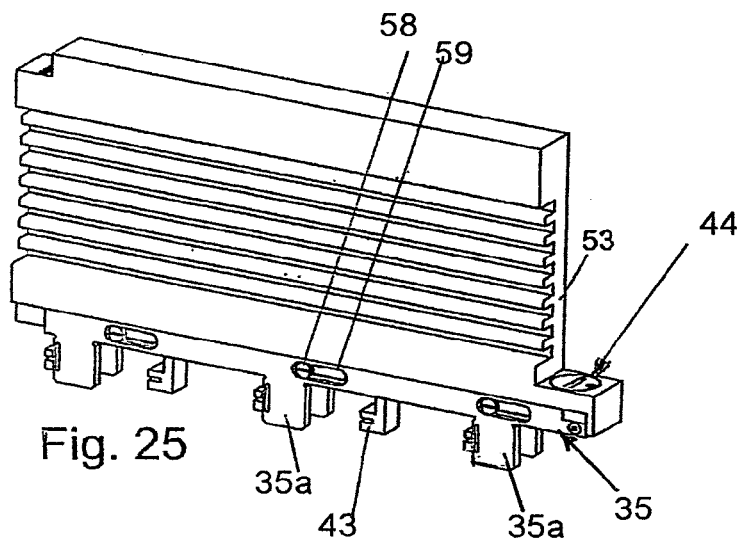
Figure 26:
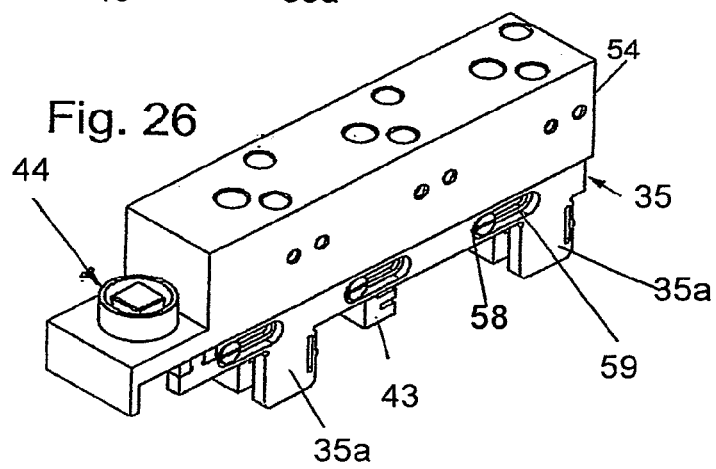

As will be described in greater detail below, mounting recesses 12 are provided in the support body 1 at the upper and lower edges of the vertical groove wall 6c. The grooves are provided with notches 9 that define catches 10 directly opposite the catches 8 defined by the edges of the overhanging horizontal portions 3b and 4b. The upper surface of the support body 1 also contains a longitudinal groove 7 for receiving an indicia-bearing label, or the like. The support body contains a plurality of weight-reducing longitudinal channels 18, 19, and 20, and the lower corners of the component contain connecting grooves 24, as will be described in greater detail below. In the embodiment of FIG. 1, two grooves 6 are provided in the upper surface of the support body, while in the modification of FIGS. 3 and 4, three longitudinal grooves 6 are provided.

Referring now to FIGS. 5-7, a plurality of the support bodies are joined in side-by-side relation by means of a joining member 21 having a center portion 21a arranged between a pair of longitudinally extending enlarged side portions 21b. The enlarged portions 21b extend in snapped engagement within the corresponding mounting grooves 24 provided in the bottom corners of the support bodies 1, thereby to define a planar assembly of the support bodies.

Referring now to FIGS. 8-10, if desired, a connecting member 28 may be provided having leg portions 30 and 31 that extend downwardly into a selected groove 6. The leg portions 30 and 31 are provided with outwardly extending projections 32 and 33 that engage the catches 8 and 10 provided adjacent the groove 6. As shown in FIG. 9, the center portion of the connecting member 28 contains a vertical internally threaded bore 56 for fastening a component to the support surface 29 of the connecting member 28, thereby to permit an auxiliary component to be fastened to the upper surface of the support bodies 1.

Similarly, in order to provide means for fastening the support body assembly to a fixed support, a connecting element 22 (FIGS. 11a and 11b), may be connected in recesses 60 contained in the lower corners of the support bodies, which connecting element has a central bore for receiving a fastening screw 11. In FIGS. 5 and 11a, corresponding ends of the support bodies are connected together, whereby the upper portions of the adjacent vertical walls of the support bodies define a configuration of an inverted L, as shown by the reference numeral 57. Of course, as shown in FIGS. 12 and 13, in the orientation of two adjacent support panels are reversed, the adjacent surfaces 57 define a T configuration. In the arrangement of FIG. 13, certain of the grooves are provided with ground rail conductors 17 supported by vertical synthetic plastic support strips 15, and other grooves are provided with power or signal transmitting rails 16.

Figure 57A:
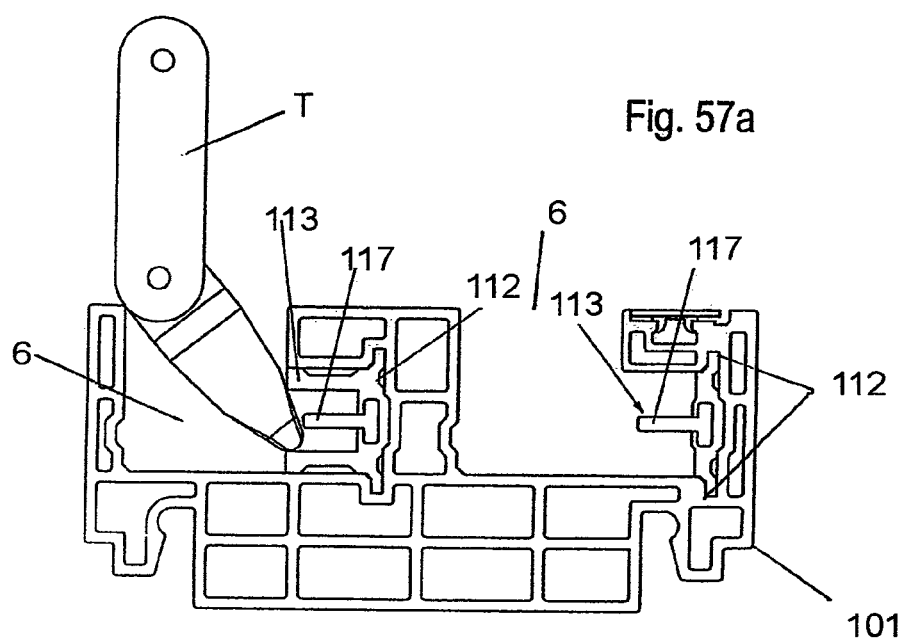
FIG. 57a is a side elevation view illustrating the manner in which a rail support strip is snapped into position in the associated groove.
Figure 57B:
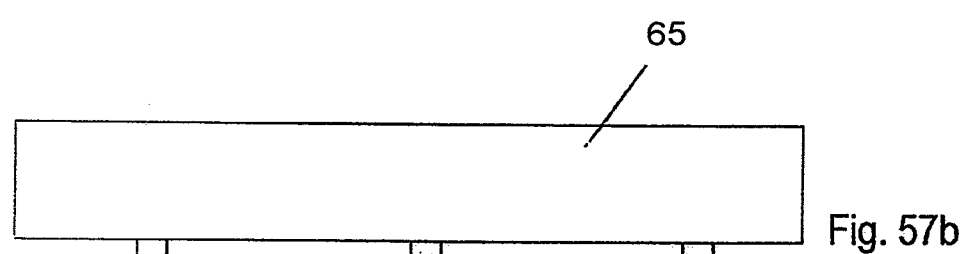
FIG. 57b is an exploded view of a further assembly between and electrical component and a support body.

Referring now to FIGS. 53-56, it will be seen that the electrically conducting rail means 113 include a vertical base portion 115 that is formed from a resilient synthetic plastic material, with the conductive metal rails 116 and 117 extending orthogonally horizontally from the vertical base portion 115. The upper and lower edges of the base portion 115 are snapped into the mounting recesses 12 (FIG. 2) and 112 (FIG. 57a) provided in the groove walls at the upper and lower edges of the concealed vertical groove wall 6c. The conductive rail 117 comprises a ground rail electrically connected with ground, and the conductive rails 116 are power or information signal-carrying rails transmitting power or signals supplied by source 170. In certain instances, the conductive member 113a of FIG. 53 comprises a simple conductive sheet or plate. As shown in FIG. 57a, an assembly tool T may be inserted into the grooves 6 to snap the upper and lower edges of the flexible base portion 115 into corresponding upper and lower recesses 112 contained in the grooves adjacent the walls 6c. In the case of a rail unit includes a plurality of signal or power carrying rails 116, the corresponding contacts 143 carried by the electrical component 65 include a plurality of tulip-type contacts (as shown generally in FIG. 57b) for engagement with the respective rails 116. As shown in FIG. 57b, a mounting component 174 may be carried by the lower surface of the electrical unit 65 for engagement with the associated vertical wall 6c of the groove 6. The term "bus rail" is not to be construed too narrowly; it includes not only a data bus rail on the one hand already transmitting data signals either electrically or optically, but also a power rail for transmitting power to attached a component attached to the support body, to the adapter component discussed below, or to field devices, such as sensors, actuators, tripping devices, and the like. It also includes conductor rails of all types, including ground rails.

Referring now to FIGS. 14 and 15, the adaptor mounting component 34 is of generally rectangular configuration and includes a connector frame 35 that is slidably connected with the lower portion of the adaptor element 34. As shown in FIG. 20, the frame 35 has a generally U-shape configuration and includes a pair of longitudinally extending leg portions 35b adjacent the outer surfaces of the adaptor element 34, and a transverse portion 35c that extends beneath the adaptor element. The leg portions 35b contain longitudinally-extending slots 59 that receive the mounting screws 58. The connector frame 35 includes integral downwardly extending leg portions 35a that are adapted to extend within the grooves contained in the upper surface of the associated support body. As shown in FIG. 15, the transverse portion 35c contains a slot 47 that receives an eccentric drive pin 45 that is eccentrically mounted on a cylindrical disk 46 that is mounted for rotation in the adaptor element. The eccentric pin, disk and slot arrangement comprise operating means 44 for mechanically displacing the adaptor element 34 between its insertion position of FIGS. 14 and 15 and its connected position shown in FIGS. 16 and 17. The leg portions 35a of the frame include projections 40 that engage the catch surfaces 8 when the feet are inserted in the corresponding grooves. It will be seen from FIGS. 15 and 17 that the contacts 43 extend downwardly from the bottom surface 34a of the adaptor component. The rail members 37 and 38 that are fastened to the upper surface of the adaptor member have an inverted hat-shaped configuration, thereby to provide means for connection with associated electrical terminal blocks (not shown).

With reference now to FIGS. 25-28, various electrical components 53, 54, and 48 may be provided with the U-shaped mounting frame means 35 that are slidably connected with the lower portion of the electrical component. In FIG. 27, it will be seen that the connectors 43 connected with the bottom of the component 54 are directed away from the end of the component divided with the operating means 44, while in the component of FIG. 28, the connectors 43 are directed toward the end of the component provided with the operating means 44.

Figure 31:
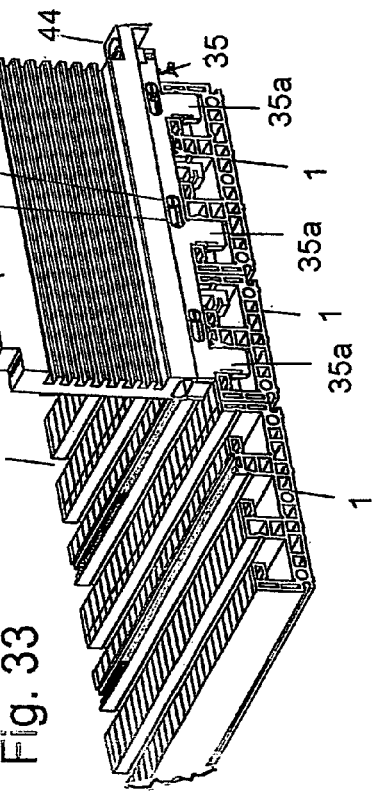
Figure 32:
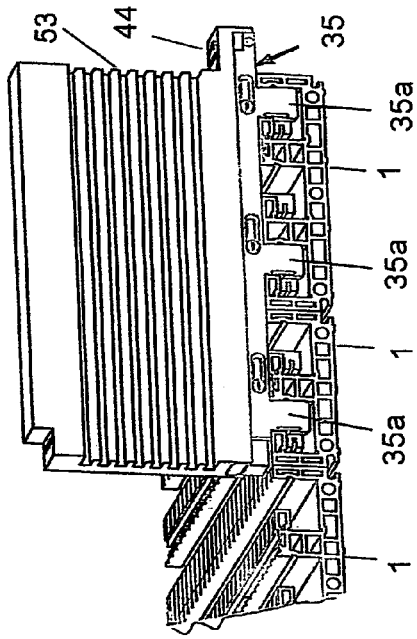
FIGS. 32-34 are corresponding perspective views, respectively.
Figure 33:
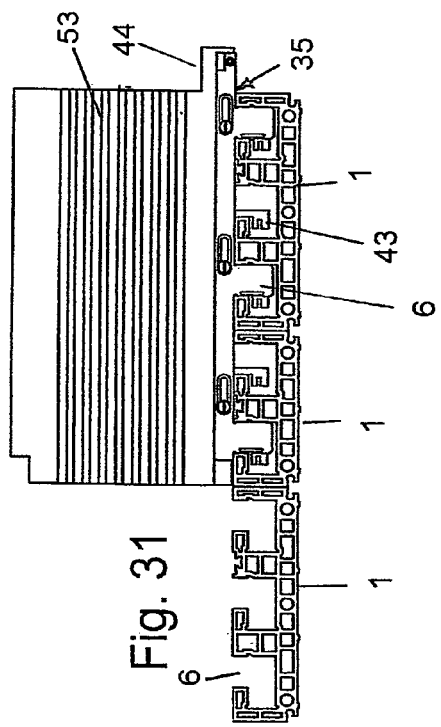
Figure 34:
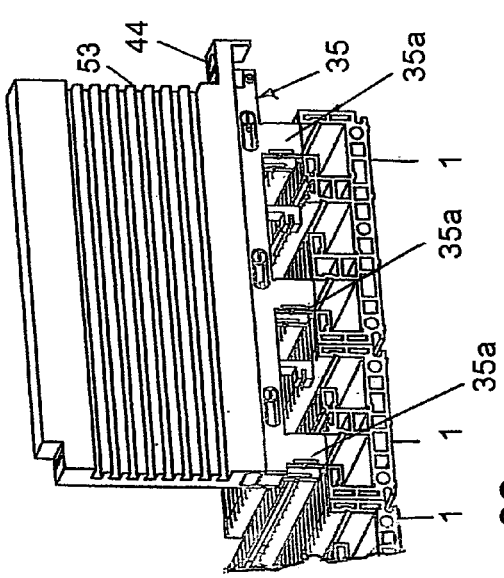

FIGS. 29-31 illustrate the steps for mounting a so-called SSR module 53 onto a support body assembly 1 by means of a frame 35 that is slidably connected to the bottom of the module 53. Thus, the module is arranged with the foot portions 35a of the frame 35 over the grooves 6, whereupon the module is displaced downwardly toward the inserted position of FIG. 30. The operating means 44 is then operated to displace the module 53 to the left toward the connected position relative to the frame 35, whereupon the contacts 43 are displaced to positions below the overhang portions of the respective support bodies 1. When in the connected position shown in FIG. 31, the contacts 43 are operable to engage the corresponding rails (which have been omitted for clarity). The corresponding assembly steps are shown in perspective views 32-34, respectively.

The electrical component 48 shown in FIG. 28 is provided at one end with electrical contacts 49. As shown in FIGS. 35 and 37, after the electrical component 48 is mounted on the assembly of support bodies 1 by means of the associated mounting frame 35, a second electrical component 53 is placed in the inserted position on the support body assembly, whereupon the operating means 44 is operated to displace the electrical component 53 to the left, thereby to effect electrical engagement between the contacts 49 on the component 48, and the corresponding contacts 50 on the electrical component 53.

Referring now to FIGS. 38 and 39, an assembly is shown wherein an electrical component 48 is initially mounted on the support bodies assembly 1 by operation of the associated operating means 44 and the displacement of the component relative to its associated mounting frame means. The adaptor component 34 is then assembled by means of it associated mounting frame 35 that is operated by the corresponding operating means 44, thereby to effect connection between the contacts 49 on the component 48, and the contacts 50 on the adaptor component 34. Two further electrical components are then mounted on the support rails 37 and 38, as is known in the art.

Figure 41:
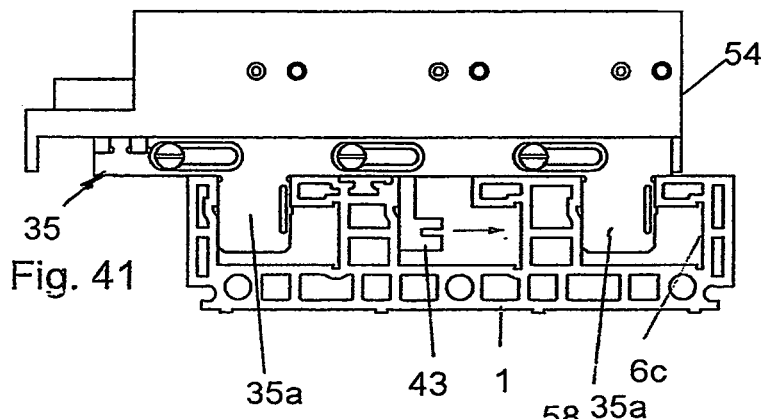
FIGS. 41 and 42 are side elevation views illustrating the electrical component in the inserted and connected conditions relative to the support body.
Figure 42:
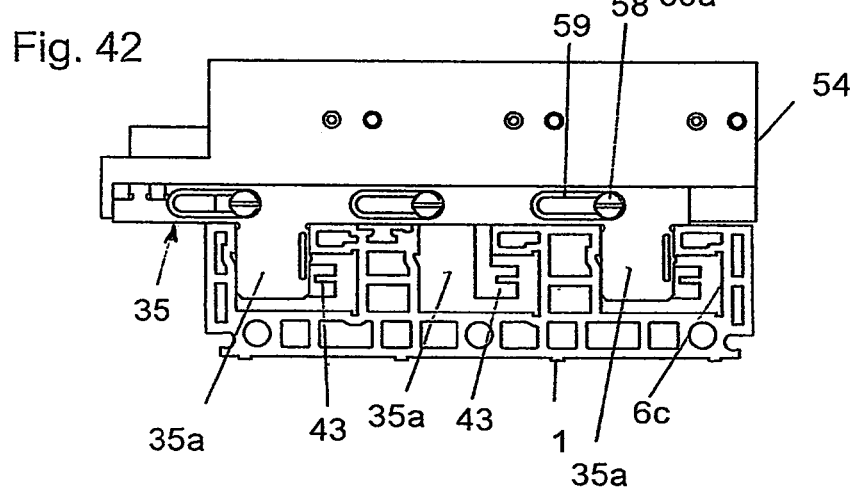

In the assembly shown in FIGS. 40-42, the operating means 44 on the component 54 serves to displace this component relative to the right from the inserted position toward the connected position relative to the mounting frame means 35, thereby to effect connection between the contacts 43 extending from the bottom of the unit 54 toward engagement with the rail connectors (not shown for purposed of clarity) that are mounted in the grooves 6.

Figure 43:
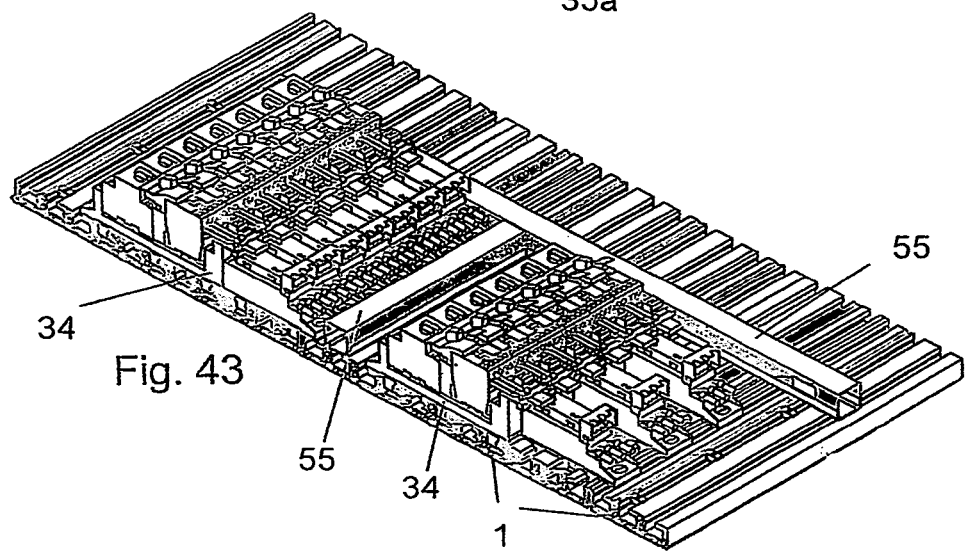
FIG. 43 is a perspective view of a plurality of electrical components mounted on an assembly of support bodies.
Figure 51:
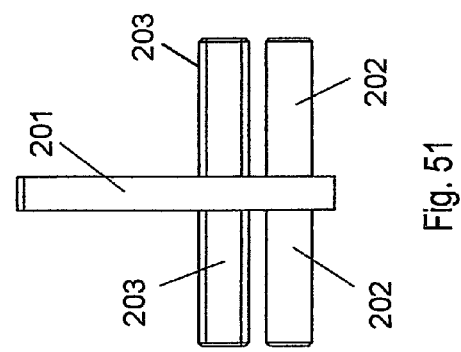
FIGS. 50 and 51 are perspective and right hand end views, respectively, of a modified version of the joining member of FIG. 48.

As shown in FIG. 43, by use of various adaptor components 34, a plurality of electrical components may be mounted on the assembly of support bodies 1. A border component 55 may be provided for defining borders of the various arrangements.

Referring now to FIGS. 44-47, a second embodiment 101 of the support body is provided having a base portion 102 containing a plurality of hollow channels 118 arranged in a honeycomb configuration, thereby strengthening the base portion of the support body. Mounting grooves 125 and 126 are provided for connecting together a pair of the support bodies 101 in side-by-side relation by means of a joining element 121 having a generally U-shaped cross sectional configuration. As shown in FIG. 45, the joining element 121 has arm portions 121c and 121d that extend upwardly into the mounting grooves 124 and 125, respectively, which arms terminate at their upper extremities in enlarged portions 121e that are snapped within corresponding recesses contained in the grooves 124 and 125. In the illustrated embodiment, the joining element 121 is formed from a linear length of a flexible synthetic plastic strip containing longitudinally spaced bores 121b, which bores receive screw members 200 for fastening the assembled support bodies 101 to a fixed support.

Figure 48:
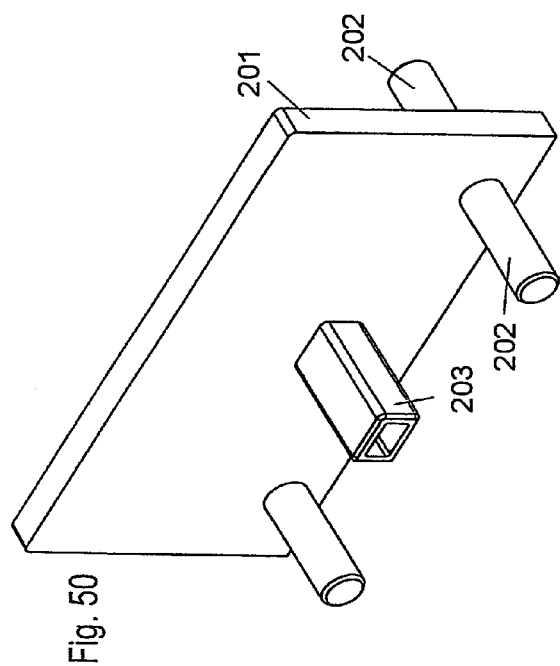
FIGS. 48 and 49 are perspective views of an end-to-end joining member and of a support body assembly using that joining member, respectively.
Figure 50:
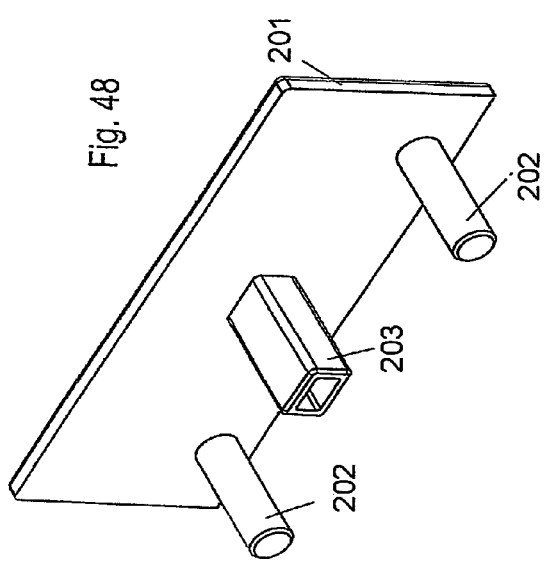
Figure 49:
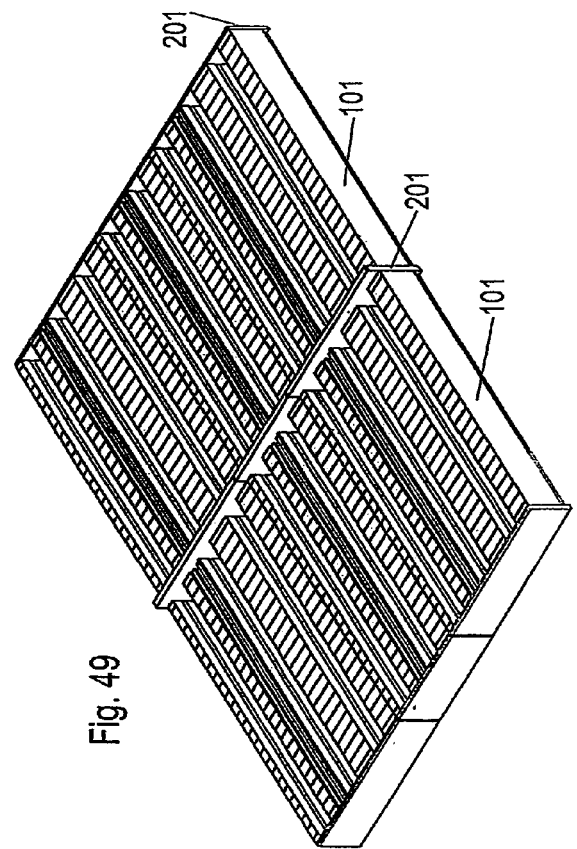

Referring now to FIGS. 48-52, in order to assemble a plurality of support panels 101 in end-to-end relation, a joining panel 201 is provided having a planar vertical panel portion 201, from at least one side of which extend orthogonally a plurality of horizontal fastening elements 202 and 203 that extend within corresponding through channels contained in the support bodies 101. In the embodiment of FIG. 48, the joining elements 202 and 203 extend only from one side of the panel, and in FIGS. 50 and 51, the joining elements extend from both sides of the panel.

Figure 58:
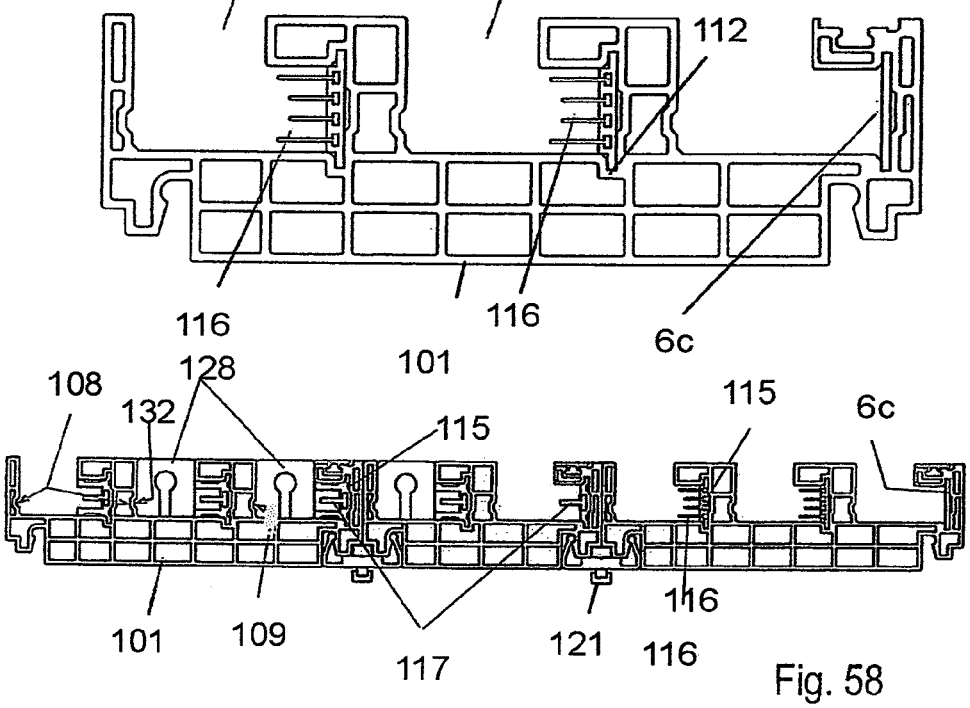
FIG. 58 is a side elevation view of a support body assembly containing a plurality of mounting blocks.

As shown in FIGS. 58-60, a plurality of mounting elements 128 are provided that extend downwardly within grooves 6 contained in the support bodies 101. As shown in FIG. 59, the mounting elements 128 are generally of an inverted U-shape configuration and include a center portion that contains a threaded opening 158, and a pair of downwardly extending leg portions, one of which is provided with an external longitudinally extending rib 132 that extends within the corresponding longitudinal groove 6e contained in the groove sidewall. The mounting member 128 is formed from a resilient synthetic plastic material and includes leg portions 128b that extend downwardly from a central through bore 128a.

Referring to FIGS. 61-63, the adaptor component 134 is provided with a slidably connected U-shaped mounting member 135 having downwardly extending leg portions 135a that extend within corresponding grooves contained in the upper surface of the support body. The mounting frame 135 is displaceable relative to the adaptor component 134 by means of the eccentric operating means 144. In this embodiment, the adaptor component 134 includes upwardly directed contacts 207 that extend within corresponding openings 208a contained in the bottom wall of an electrical component 208 that is mounted on the adaptor component, as shown in FIG. 63. Connector elements 143 extend downwardly from the adaptor component 134 for connection with the rail conductors mounted in the associated grooves of the support bodies, as described above.

In accordance with another feature of the invention, locking means may be provided for locking the electrical component to the support body. Referring to FIGS. 64-66, it will be seen that a locking member 209 is supported for vertical displacement relative to the electrical component 155. The locking member 209 is normally biased downwardly relative to the electrical component 155 by a compression spring 210 that is contained in the chamber 211 within which the locking member 209 is vertically displaceable. An operating lever 212 is provided that is pivotally connected with the electrical component 155 about a pivot axis 215. In these figures, the mounting frame 135 has been omitted for purposes of illustration. Of course, it is also possible to manually displace the electrical component from its inserted position of FIG. 65 toward the connected position of FIG. 66. Thus, when the electrical component 155 is in its initial condition illustrated in FIG. 64, the tip of an operating tool, such as a screw driver, is inserted into the slot 214 contained in the lever 212, and the lever 212 is pivoted in the counter-clockwise direction about axis 215 thereby to elevated locking member 209 to the retracted position shown in FIG. 65. When the electrical component 155 is shifted to the right to the connected position shown in FIG. 66, the locking element 209 is biased downwardly by the compression spring 210, thereby to prevent electrical component 155 from being displaced to the left relative to the support body 1.

To release the locking member 209 from its locked condition of FIG. 66, the tip of a screw drive is inserted into the slot 214, and the lever 212 is pivoted to elevate the locking element 209 to its retracted position shown in FIG. 65.

Although the invention has been described in connection with electrical connectors for connecting conductive rails to circuits in an electrical component, it is apparent that the invention also pertains to optical, hydraulic and pneumatic systems as well. The terms mechanical and electrical components could also include fluid modules for compressed air supply and/or control.

While in accordance with the provisions of the Patent Statutes the preferred forms and embodiments of the invention have been illustrated and described, it will be apparent to those skilled in the art that changes may be made without deviating from the invention described above.

What is claimed is:

1. A mounting arrangement for mounting electrical and mechanical components on a support body, comprising:
   (a) a generally-rectangular support body (1; 101) formed from electrically-insulating synthetic plastic material having a horizontal base portion (2; 102), and a horizontal upper surface containing at least one longitudinally-extending groove (6) that defines in said support body first and second longitudinally-extending vertical walls (3, 5) that extend upwardly from said base portion, said first vertical wall (3) including:
      (1) a vertical portion (3a) having an upper end; and
      (2) at least one integral horizontal portion (3b) extending from said vertical portion upper end partially into said groove, thereby to define an overhang that extends over a given vertical wall (6c) of said groove;
   (b) a generally-rectangular first component (34) arranged transversely above said support body and said groove, said component including a housing having a bottom surface (34a) seated on said support body horizontal upper surface; and
   (c) connecting means extending from said component into said groove for connecting said component with said support body, said connecting means including:
      (1) a first connector element (17) mounted on said given groove vertical side wall surface (6c) located beneath said overhang; and
      (2) a second connector element (43) connected with said component housing bottom surface, said first component being initially displaceable downwardly from a separated position relative to said support body toward an initial inserted position mounted on said support body top surface with said second connector element extending into said groove toward an initial inserted position opposite and spaced from said first connector element, said first component being subsequently displaceable horizontally transversely of said body member from said inserted position toward a connected position adjacent said first vertical wall in which second connector element is connected with said first connector element.

2. A mounting arrangement as defined in claim 1, wherein said connecting means further includes:
   (3) displacing means (35) arranged between said support body and said first component for displacing said first component between said inserted position and said connected position.

3. A mounting arrangement as defined in claim 2, wherein said displacing means comprises:
   (a) a frame (35) slidably connected with the lower portion of said component, said frame having at least one foot portion (35a) extending into said groove in engagement with a wall portion thereof; and
   (b) operating means (44) for displacing said frame relative to said component.

4. A mounting arrangement as defined in claim 3, wherein said frame includes a transverse portion (35c) containing a slot (47); and further wherein said operating means includes:
   (1) a cylindrical member (46) rotatably connected with said component, and
   (2) an eccentric pin (45) eccentrically connected with said cylindrical member, said pin extending into said slot.

5. A mounting arrangement as defined in claim 4, wherein said frame is generally U-shaped and includes a pair of horizontal leg portions (35b) that carry said foot portions and that extend longitudinally from said frame transverse portion on opposite sides of said component; and pin and slot means (58, 59) connecting said frame leg portions for horizontal sliding movement relative to said component.

6. A mounting arrangement as defined in claim 1, and further including:
(d) locking means (209) for locking said component in said connected position.

7. A mounting arrangement as defined in claim 6, wherein said locking means comprises:
(1) a locking member (209) connected for vertical movement relative to said component between upper retracted and lower locked positions, said locking member in said locked position extending into said groove when said component is in said connected position, thereby to prevent horizontal displacement of said component toward said inserted position;
(2) spring means (210) biasing said locking member toward said locked position; and
(3) lever means (212) for displacing said locking member from said locked position toward said retracted position.

8. A mounting arrangement as defined in claim 1, wherein said first and second connectors are electrically conductive.

9. A mounting arrangement as defined in claim 8, wherein said first connector comprises conductive rail means (13, 14; 113) that extend longitudinally of said groove.

10. A mounting arrangement as defined in claim 9, wherein said rail means comprises at least one horizontal conductive rail (16, 17; 116, 117), and a vertical rail support strip (15; 115) supporting said rail adjacent said given groove vertical wall surface (6c), said support strip extending longitudinally of said groove.

11. A mounting arrangement as defined in claim 10, wherein said rail support strip is formed from a flexible electrically-insulating synthetic plastic material, said support strip having upper and lower edge portions that are snapped into corresponding recesses (12) contained in horizontal wall surfaces of the groove adjacent said given groove vertical wall surface.

12. A mounting arrangement as defined in claim 11, wherein said rail is a ground rail (17; 117).

13. A mounting arrangement as defined in claim 11, wherein said rail is a signal-carrying rail (16; 116).

14. A mounting arrangement as defined in claim 11, wherein said rail means includes a plurality of parallel adjacent conductive rails (117) at least one of which is a ground rail and at least one of which is a signal-carrying rail.

15. A mounting arrangement as defined in claim 11, wherein said rail is an electrical power-carrying rail.

16. A mounting arrangement as defined in claim 10, wherein said second connector comprises female contact means (43; 143) including a pair of resilient contacts arrange to receive therebetween a corresponding rail when said connectors are in the connected position.

17. A mounting arrangement as defined in claim 16, wherein said component is an electrical component (51, 52, 53, 54, 55, 155) having at least one electrical circuit connected with said second contact.

18. A mounting arrangement as defined in claim 16, wherein said component is an adapter component (35) having an upper surface, and at least one conductive mounting rail (37, 38) mounted on said adapter component upper surface, said mounting rail being electrically connected with at least one of the associated second conductors (43).

19. A mounting arrangement as defined in claim 18, wherein said mounting rail has a generally inverted hat-shaped configuration including a pair of outwardly extending horizontal flange portions, thereby to support a terminal block component.

20. A mounting arrangement as defined in claim 10, wherein said support body upper surface contains a plurality of parallel grooves (6).

21. A mounting arrangement as defined in claim 20, and further including support body joining means for connecting together a plurality of said support bodies contained in a common plane, thereby to define an assembly of said support bodies.

22. A mounting arrangement as defined in claim 21, wherein said support bodies (1) are arranged in side-by-side relation; and further wherein said joining means comprises a horizontal joining member (21, 22, 121) having enlarged remote end portions (21a, 22a, 121a) extending within corresponding recesses (24, 60, 124) contained in the side portions of said support bodies.

23. A mounting arrangement as defined in claim 22, wherein said joining member contains a vertical bore for receiving a fastening screw (11; 200), thereby to permit fastening of the support bodies to a fixed support.

24. A mounting arrangement as defined in claim 21, wherein said support bodies (101) are arranged end-to-end relation; and further wherein said joining means comprises a vertical planar joining member (201) arranged transversely between pairs of said body members, said joining members having orthogonally extending projections (202, 203) that extend into corresponding hollow channels provided in said support bodies.

25. A mounting arrangement as defined in claim 21, and further including a plurality of electrical components (48, 53) mounted end-to-end transversely of said support body assembly, and contact means (49, 50) electrically connecting together adjacent ends of said electrical components.

26. A mounting arrangement as defined in claim 20, wherein said support body upper surface contains an opening (7) for receiving a label.

27. A mounting arrangement as defined in claim 20, wherein and further including a connecting member (28; 128) mounted in one of said grooves, said connecting member having an upper surface containing a vertical threaded bore (56; 156); a planar upper mounting plate (206) extending across said connecting member upper surface and said support body upper surface; and a fastening screw (204) extending through a bore contained in said upper mounting plate and into said connecting member threaded bore.

28. A mounting arrangement as defined in claim 22, wherein said vertical walls are arranged to define a T-shaped cross-sectional arrangement.

29. A mounting arrangement as defined in claim 1, wherein said support body contains a plurality of longitudinally-extending weight-reducing through channels (18, 19, 20).

30. A mounting arrangement as defined in claim 3, wherein the walls of said groove contain catches (8, 10) that engage the foot portion of the frame when the component is in the inserted position.

31. A mounting arrangement as defined in claim 1, wherein said connecting means comprise fiber-optic connectors.

32. A mounting arrangement as defined in claim 1, wherein said connecting means comprise hydraulic connectors.

33. A mounting arrangement as defined in claim 1, wherein said connecting means comprise pneumatic connectors.

* * * * *